(12) United States Patent
Krause

(10) Patent No.: US 7,628,564 B2
(45) Date of Patent: Dec. 8, 2009

(54) BOAT LAUNCHING, RETRIEVAL, AND TRANSPORT METHOD

(75) Inventor: Herbert Krause, Bellingham, WA (US); Linda Krause, legal representative, Bellingham, WA (US)

(73) Assignee: Krause Manufacturing, Bellingham, WA (US)

( * ) Notice: Subject to any disclaimer, the term of this patent is extended or adjusted under 35 U.S.C. 154(b) by 288 days.

(21) Appl. No.: 11/873,321

(22) Filed: Oct. 16, 2007

(65) Prior Publication Data
US 2009/0080974 A1 Mar. 26, 2009

Related U.S. Application Data

(63) Continuation of application No. 11/485,707, filed on Jul. 12, 2006, now abandoned.

(60) Provisional application No. 60/975,424, filed on Sep. 26, 2007.

(51) Int. Cl.
*B63C 5/04* (2006.01)
(52) U.S. Cl. .............................. 405/3; 405/7; 114/344
(58) Field of Classification Search .................. 405/3, 405/4, 7, 218; 114/44, 344
See application file for complete search history.

(56) References Cited

U.S. PATENT DOCUMENTS

| | | | |
|---|---|---|---|
| 2,889,564 A | 6/1959 | Wright |
| 2,919,825 A | 1/1960 | Hornsby |
| 2,990,966 A | 7/1961 | Schramm |
| 3,003,780 A | 10/1961 | Lundahl |
| 3,018,906 A | 1/1962 | Franklin |
| 3,079,616 A | 3/1963 | Byberg |
| 3,128,066 A | 4/1964 | Bailey |
| 3,130,842 A | 4/1964 | Alfonso |
| 3,155,249 A | 11/1964 | Johnson |
| 3,288,315 A | 11/1966 | Bigden |
| 3,512,667 A | 5/1970 | Calkins |
| 3,568,624 A | 3/1971 | Biorklund |
| 3,608,754 A | 9/1971 | Park |
| 3,768,677 A | 10/1973 | Moss |
| 3,888,367 A | 6/1975 | Cox |
| 4,286,346 A | 9/1981 | Wiek |
| 4,395,185 A | 7/1983 | Whaley |
| 4,417,841 A | 11/1983 | Chadwick |
| 4,735,545 A | 4/1988 | Knijpstra |
| 4,801,153 A | 1/1989 | Wilson |

(Continued)

OTHER PUBLICATIONS

PCT/US2008/074427, Written Opinion of the International Searching Authority, KIPO, Dec. 19, 2008.

(Continued)

*Primary Examiner*—Tara Mayo-Pinnock
(74) *Attorney, Agent, or Firm*—Stephen C. Beuerle; Procopio Cory Hargreaves & Savitch LLP

(57) ABSTRACT

A method of retrieving a boat from the water by supporting the boat by two lift sections, each of which has an inflatable bunker and a cradle structure that supports and positions the bunker. The lift sections are connected to a mobile support structure which brings these lift sections to a location near the water into which the boat is to be retrieved. The lift sections are lowered and positioned into the water and the boat is floated into the lift region between them. The lift sections are raised upwardly to carry the boat from the water and to another location over a land surface.

10 Claims, 20 Drawing Sheets

U.S. PATENT DOCUMENTS

| | | | |
|---|---|---|---|
| 4,824,127 A * | 4/1989 | Stamm | 280/47.331 |
| 5,152,656 A | 10/1992 | Potter | |
| 5,152,657 A | 10/1992 | Kehne | |
| 5,176,394 A * | 1/1993 | Veazey | 280/414.2 |
| 5,228,713 A | 7/1993 | Kovach | |
| 5,366,336 A | 11/1994 | Friesen et al. | |
| 5,678,977 A | 10/1997 | Norlund | |
| 5,857,823 A | 1/1999 | MacEachern | |
| 5,921,742 A | 7/1999 | Gearhart | |
| 5,924,836 A | 7/1999 | Kelly | |
| 6,003,888 A | 12/1999 | Godbersen | |
| 6,079,729 A * | 6/2000 | Braun | 280/414.1 |
| 6,341,793 B2 * | 1/2002 | Braun | 280/414.1 |
| 6,575,487 B1 * | 6/2003 | Krause | 280/414.1 |
| 6,695,336 B1 * | 2/2004 | Grabenstetter | 280/414.2 |
| 7,213,798 B1 * | 5/2007 | Thompson et al. | 254/323 |
| 7,281,728 B1 * | 10/2007 | Wayrynen | 280/414.1 |
| 7,455,310 B2 * | 11/2008 | Hyslop | 280/414.1 |

OTHER PUBLICATIONS

PCT/US2008/074427, International Search Report, KIPO, Dec. 19, 2008.

* cited by examiner

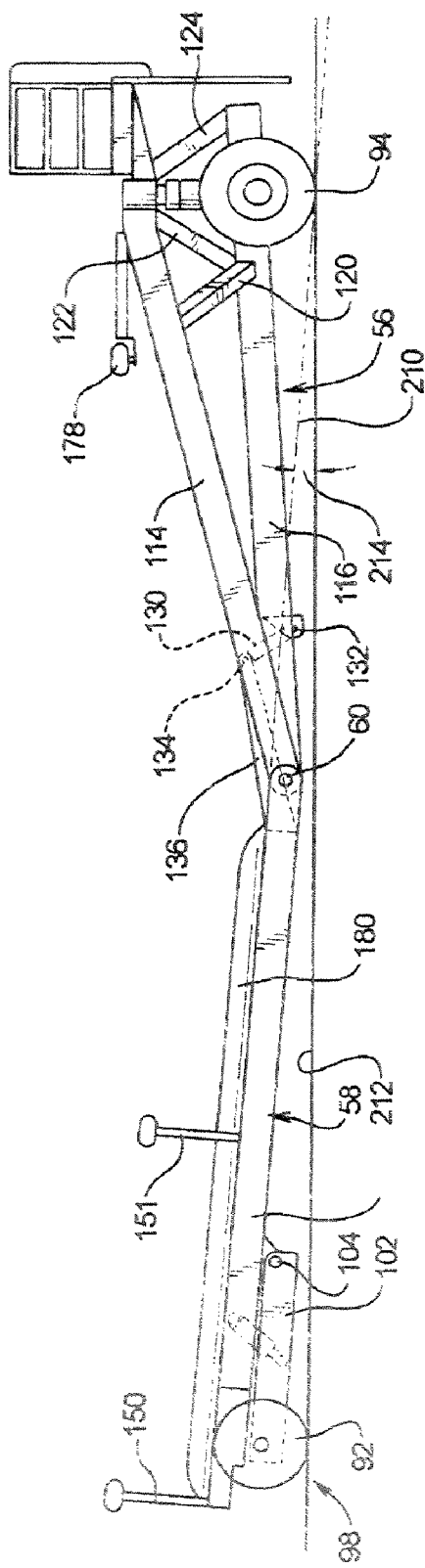
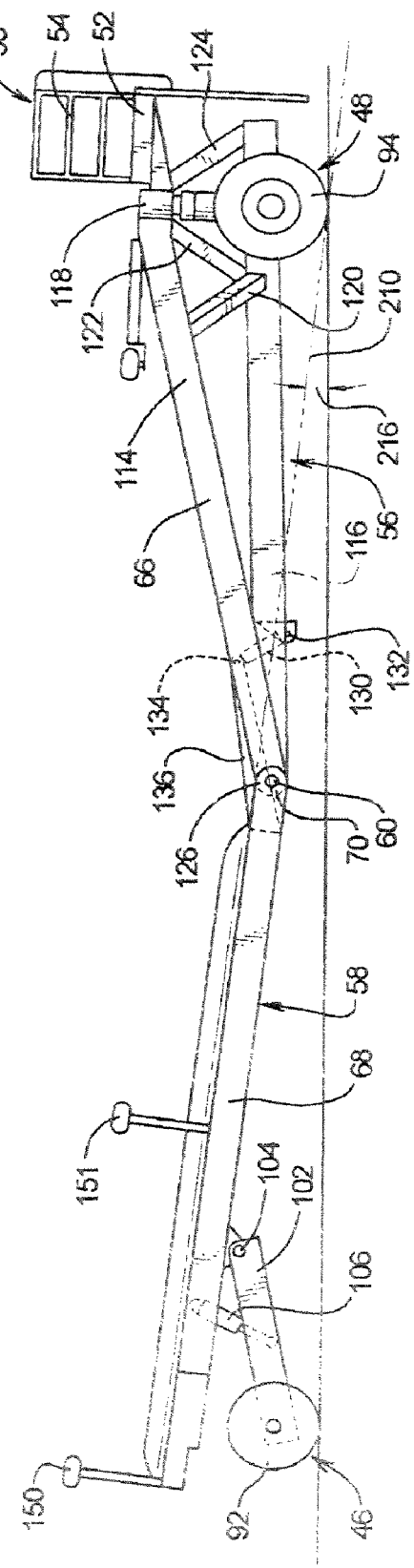

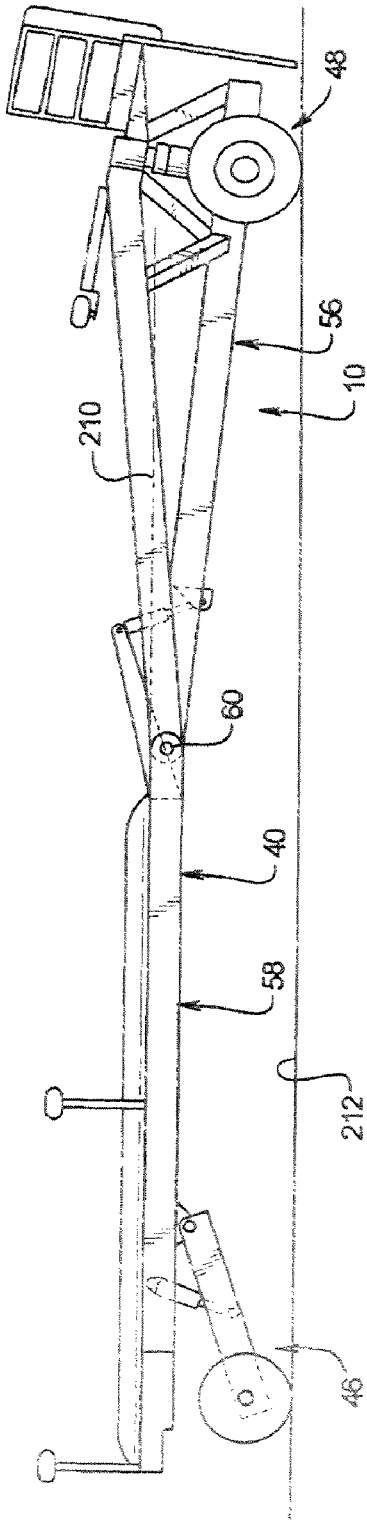
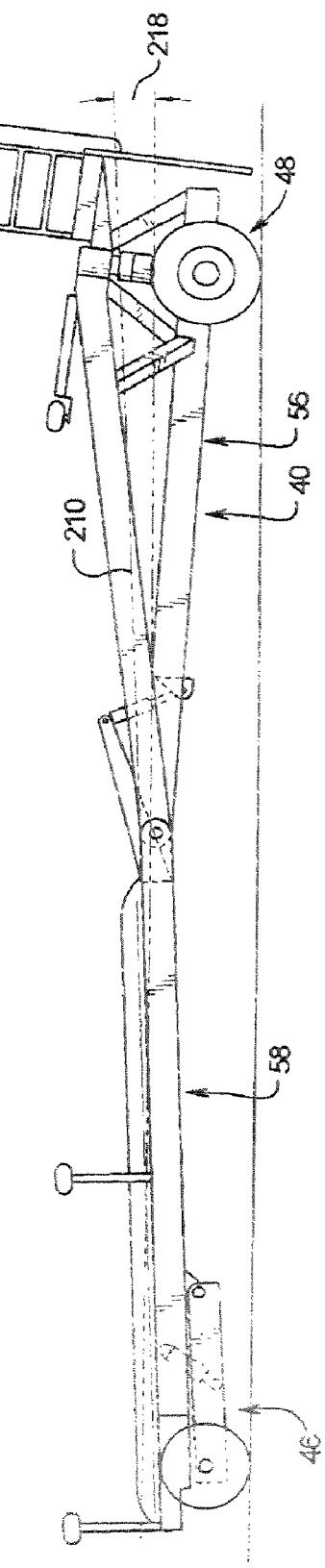

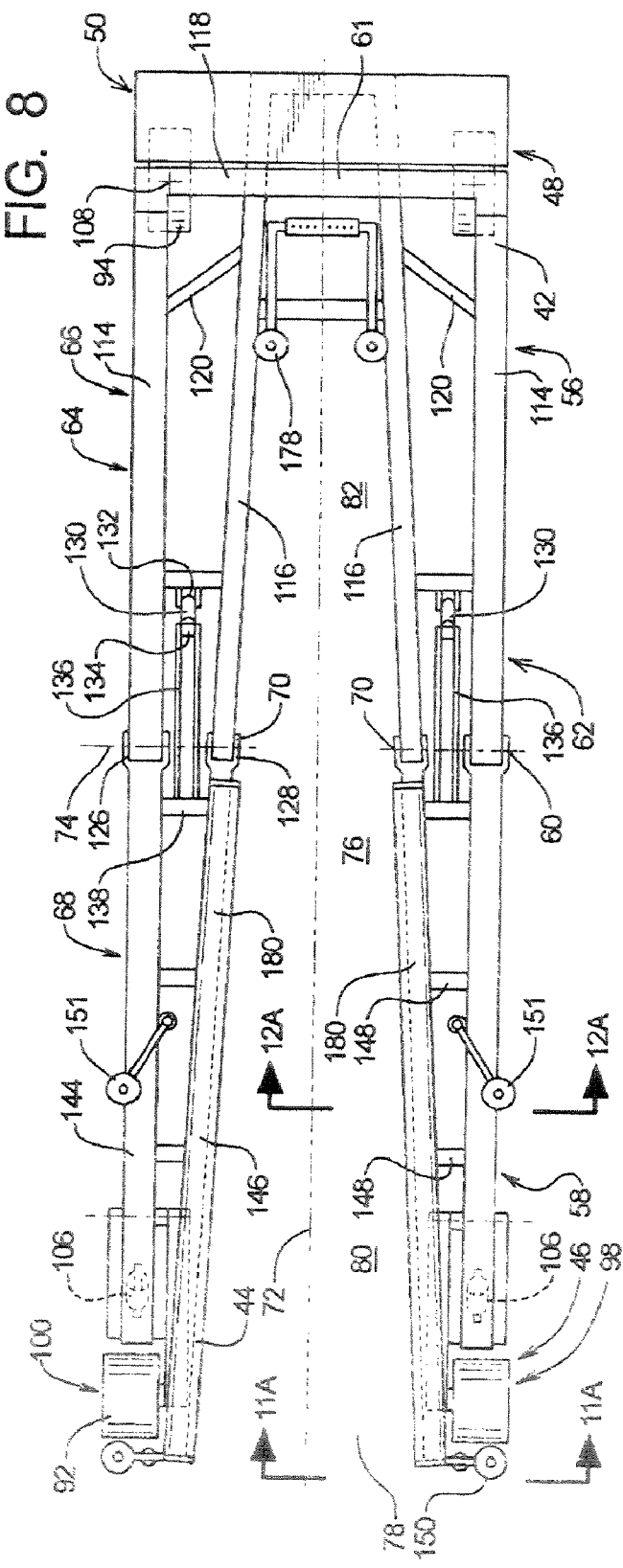
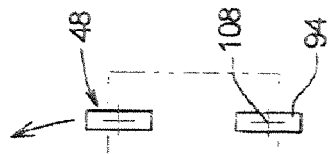
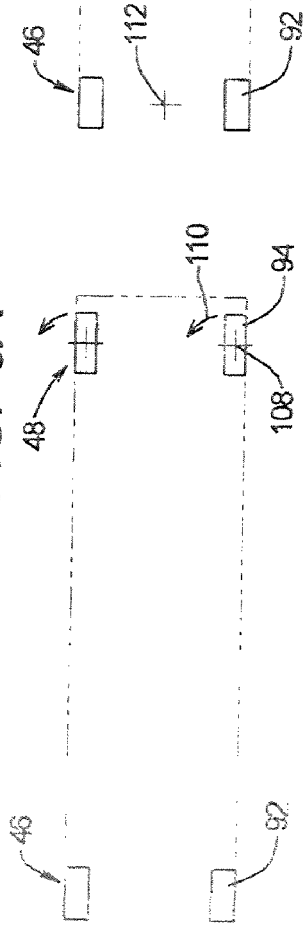

BOAT LAUNCHING, RETRIEVAL, AND TRANSPORT METHOD

RELATED APPLICATIONS

This application is claiming priority of U.S. Provisional Application Ser. No. 60/975,424 filed Sep. 27, 2007. This is a continuation of U.S. Ser. No. 11/485,707 filed Jul. 12, 2006, now abandoned, which claims priority benefit of U.S. Ser. No. 11/058,493 filed Feb. 14, 2005, now abandoned, which claims priority benefit of U.S. Ser. No. 10/745,058 filed Dec. 22, 2003, now abandoned, which claims priority benefit of U.S. Ser. No. 10/459,361 filed Jun. 10, 2003, now abandoned, which claims priority benefit of U.S. Ser. No. 09/935,486 filed Aug. 22, 2001, now U.S. Pat. No. 6,575,487, which claims priority benefit of U.S. Provisional Application Ser. No. 60/278,167 filed Mar. 22, 2001.

BACKGROUND OF THE INVENTION a) Field of the Invention

The present application relates to a method for retrieving a boat out of the water, and launching of a boat into the water, or both launching and retrieving the boat, as well as transporting the boat over a ground surface.

b) Background Art

Smaller boats are commonly carried on boat trailers and are placed into the water or taken back out of the water generally by first finding a boat launching site where there is a slanting support surface (generally graveled or asphalt) which slopes downwardly into the body of water. The trailer is backed downwardly down the boat ramp to a depth where the boat is able to float. Then the boat is disconnected and moved away from the trailer, with the trailer then being pulled back out of the water. However, while this procedure is used quite commonly for smaller boats, for a variety of reasons it is used less frequently (if at all) for larger boats.

In a marina, boats of various sizes are taken out of the water for services, repair and/or storage, and at a later time are placed back into the water. A typical marina faces various challenges in having an efficient and cost effective operation. For example, the real-estate for a marina is generally at a premium, and thus the real-estate in storing the boats must be used efficiently. Further, the moving the boats into and out of the water, and into and out of storage spaces should be desirably be accomplished in the minimum amount of time. Also, there is the problem of what might be termed "traffic congestion" in moving a number of boats effectively.

Also, in recent years there has been increasing use of dry rack storage where boats can be positioned in a storage location where one boat can be located above or below the other, and forklifts and other devices are used to accomplish storage of boats and the removal of boats from the storage racks.

It's not surprising that the larger boats present challenges well beyond those that are faced with handling the smaller boats. To the best knowledge of the inventor herein, in most marinas the larger boats are usually launched into the water or taken out of the water by means of a lifting device (e.g., a hoist). Straps or other devices are placed around the boat hull, and these are engaged by the hoist to move the boat into or out of the water. With a relatively large boat (as long as forty or fifty feet), a rather large hoist is required. Again, to the best knowledge of the Applicant, it has not been practical to use the boat trailer for such large boats. Also, if trailers of sufficient size are used for the larger boats, there is the consideration of the mobility (i.e., the ability to effectively move such a large boat within the confines of a sometimes crowded marina boat storage area).

Also, there are sometimes limitations in the ability to store boats because of the possibility of causing damage to the boat. For example, if there is a yacht with a downwardly extending fin, this can result in complications in storing it out of the water, and/or also in lifting it. Further, if the contact with the boat hull (e.g., a wood hull), this could be more susceptible to damage.

A search of the U.S. patent literature has revealed a number of patents relating to the launching and retrieval of boats into and from a body of water, and also moving them over a land surface, and these are the following.

U.S. Pat. No. 5,857,823 (MacEachern), shows a trailer made up of two support structures, namely a rear support structure 18 made up of parallel beams, and a forward structure 20, these being rigidly connected to one another. At the forward end of the structure 20, there is a connection to what is called "a self-propelled tug 14". The tug has forward steering wheels 64 which are stated to operate as a conventional steering mechanism, and at the rear of the tug 14 there is a universal connection which is controlled by hydraulic cylinders. Thus, this universal joint can rotate about all three axes. Also, the rear wheels 24 of the trailer are mounted so that these can be raised or lowered individually or together.

U.S. Pat. No. 5,921,742 (Gearhart), shows an articulated roll-off trailer that is provided with a hinge so that it may bend in the middle, in an upward direction.

U.S. Pat. No. 5,228,713 (Kovach), shows a boat trailer that has an upper boat carrying a section 18, and a lower wheeled frame 19, that are pivoted in the tongue area. The boat carrying section remains level at the water's surface as the wheeled section follows the contours of the bank, or launching ramp.

U.S. Pat. No. 4,801,153 (Wilson), shows a trailer that is pivoted for easier loading. It may be backed along a bank or launching ramp, and tilted so the boat or other cargo slides or rolls off.

U.S. Pat. No. 4,395,185 (Waley), shows a boat trailer in which the wheel carrying frame is pivoted on the frame section on which the boat is mounted on. The wheel section follows the contours of the bank or the launch ramp, while the boat carrying part floats and is well oriented to load the boat.

U.S. Pat. No. 3,888,367 (Cox), shows a boat trailer with pivoted boat supporting elements that accommodate the contour of the boat bottom.

U.S. Pat. No. 3,768,677 (Moss) provides a boat trailer with wheels that can be adjusted relative to the trailer frame to accommodate the loading and unloading, on various bottom contours.

U.S. Pat. No. 3,608,754 (Park), shows a boat trailer in which the hitch and wheels are on a frame and a sub frame is pivoted at one end and supporting the boat at the other end. The sub frame supports the boat's stern and aligns it as it floats on or off the trailer.

U.S. Pat. No. 3,512,667 (Calkins), shows a boat trailer on which the boat support pivots and aligns with the boat as it is moved in or out of the water, while the wheeled sections are on a tilted bottom.

U.S. Pat. No. 3,155,249 (Johnson), shows a trailer that is provided with pivoting hull support elements.

U.S. Pat. No. 3,465,533 (Payne), discloses a "cargo transport apparatus using air cushion support". There is a blanket 18 which is connected to (and extends between) two side members 10 and 12 and on which the boat is positioned. Also, there is a rear frame member 14 and a front closure member. The blanket is able to be inflated in the region surrounding the boat so that the blanket can lift the boat upwardly at a location between the two sidewalls 10 and 12.

U.S. Pat. No. 6,155,190 (Cavanaugh), discloses an "air cushion dry dock transport system". There is a dry dock structure mounted on an air cushion platform to portage a ship overland. The system raises the ship from one body of water, hauls it across different surfaces and launches it into another body of water.

SUMMARY OF THE INVENTION

The method of the present invention is arranged to launch boats into the water, and also retrieve boats out of the water in a particularly effective way. Also, in these embodiments of the present invention, the method is arranged to be used in a manner so that the apparatus employed in the method can be maneuvered effectively over a ground surface for better utilization of land space in a marina or the like.

A first embodiment of the method of the present invention comprises use of a main support frame having a longitudinal axis, a transverse axis, a front end and a rear end. The main support frame comprises a forward main frame section and a rear main frame section. The forward and rear main frame sections are pivotally connected to one another about a pivot location, so as to be able to be rotated relative to one another between an upper pivot configuration of the main support frame, with the pivot location at a higher elevation, and a lower pivot configuration of the main support frame with the pivot location at a lower elevation.

The forward and rear main frame section are arranged as right and left main frame side portions. Each of the main frame side portions comprises a forward and a rear main frame side portion, and right and left main frame side portions define therebetween a boat receiving region. This boat receiving region comprises a rear entry portion, a rear boat receiving region portion that is located between the right and left main frame rear side portions, and a forward boat receiving region portion located between the right and left forward main frame side portions.

There is a rear wheeled support section which is connected to the rear main frame section. This rear wheeled support section is moveable between upper and lower configurations relative to the main rear frame section. There is also a forward support section connected to the forward main frame section.

The apparatus used in the method is arranged so that with the apparatus in an operating position in a body of water, the rear main frame section is able to be located at a first lower ground elevation in the body of water, with the rear support section in its upper configuration and the main support frame in its lower pivot configuration. By lowering the rear support section, the rear main frame section is then at a higher ground elevation in a body of water.

In an apparatus shown herein, each of the main frame side portions has its own pivot connection between its related main frame side portion and main frame rear side portion.

More specifically, each of the rear main frame side portions can rotate independently from one another about its related pivot connection relative to its forward main frame side portion. Also, in this method of the embodiment, the front and rear main frame side portions of each main frame side portion has a related actuator to move the rear main frame portion relative to its related forward main frame side portion.

In the apparatus used in this method of the first embodiment, the rear wheeled support section comprises left and right wheeled rear support portions, each of which has a wheel portion and a related actuator to raise or lower the wheel portion.

Also, in the configuration shown herein the forward main frame section has a front end frame portion connected between forward end portions of the forward main frame side portions. At the forward support section there is a steerable wheel section that is used in the step of the method in transporting the boat. The steerable wheel section comprises in a preferred form at least two steerable wheels spaced laterally from one another with each steerable wheel having its own steering axis about which each steerable wheel can be rotated through various steering positions. Also, there is an operating station at the forward location of the forward main frame section by which an operator can control operation of the apparatus.

In the method of the second embodiment of the present invention, the forward support section of the apparatus used in the method comprises a connection component adapted to be connected to a towing apparatus to move the transport apparatus.

In one arrangement, the rear wheeled support section is arranged to provide ground support at a support location at a rear portion of the rear main frame section.

The rear support section has a rear ground engaging support location and the forward support section has a forward support location by which the forward main frame section is supported from a ground surface. The pivot location is located at a pivot location spacing distance between about one third to three quarters of a distance from said rear ground engaging support location to the forward support location. Within narrower limits, the pivot location spacing distance is no greater than about two thirds of the distance from the rear ground engaging support location to said forward support location. With yet narrower limits, the pivot location is between about two fifths to three fifths of the distance from the rear ground engaging support location to the forward support location. As an approximation, the pivot location is about one half the distance from the rear ground engaging support location to the forward support location.

In the method of the invention, the two rear main frame side portions each have a longitudinally extending boat engaging support portion. In the method of the embodiments, each of the support portions is provided with a longitudinally extending inflatable bunker to provide support for a boat being positioned thereon.

The apparatus used in the method of this embodiment is desirably arranged in size so as to be able to support a boat of a smaller length dimension, and also a boat up to a larger maximum length dimension extending into the forward boat receiving portion. The rear main frame section is configured and has a length such that a boat of the maximum length dimension being carried by the apparatus has a center of gravity which, when the boat is positioned on the apparatus, is behind the pivot location of the apparatus used in the method of that embodiment. Thus at least a substantial portion of the weight of the boat is supported by the inflatable bunkers.

In the method of this embodiment, the apparatus is arranged so that rear main frame section is able to support at least a substantial portion of weight of a boat having a lengthwise dimension at least as great as or greater than a lengthwise dimension of the rear main frame section so that when the boat is carried by the apparatus, a forward end portion of the boat extends into the forward boat receiving region portion. The right and left rear main frame side portions have longitudinally extending support surface portions which engage the boat and which are positioned in a boat support reference plane. In this method, the apparatus being used has a ground support reference plane which is defined at a rear support location by a rear ground support location of the rear support section and at the forward end of the apparatus by a forward ground support location of the forward support section. The apparatus is arranged so that with the rear support section in its lower configuration, and with the main support frame being in its lower pivot configuration, the boat support reference plane has a downward and forward slant relative to the ground reference plane.

Also, in this method of this embodiment, the apparatus used in this embodiment is arranged so that with the rear support section being in its upper configuration and the main support frame being in its lower pivot configuration the downward and forward slope relative to the ground support reference plane is between about two degrees to twelve degrees.

Also, in the method of this embodiment, the apparatus is arranged so that with the rear support section being in its lower configuration and the main support frame being in its lower pivot configuration, the boat support plane of the apparatus has a forward and downward slope relative to the support reference plane. Also, the apparatus is arranged so that with the rear support section in its upper configuration and the main support frame being in its lower pivot configuration the boat support reference plane of the apparatus has a forward and downward slope relative to the ground support reference plane at an angle between about zero degrees to ten degrees. Further, the apparatus is arranged so that with the support section being in its upper configuration and the main support frame being in its upper pivot configuration, the boat support reference plane of the apparatus does not have a forward and downward slope relative to the ground support reference plane, and desirably has a forward and upward slope relative to the ground support reference plane.

Also, in one form of the apparatus used in this method, the apparatus is arranged so that with the rear support section being in its lower configuration and the main support frame being in its upper pivot configuration the boat support reference plane of the apparatus is approximately parallel to the ground support reference plane, and desirably between four degrees in an upward forward slant and four degrees in an upward and rearward slant.

Thus, in the method of the present invention, the apparatus is provided as indicated above, and when operating as an apparatus to remove the boat from the body of water, the boat is located in the body of water over the rear main frame section with the rear support section in its upper configuration and the main support frame section in its lower pivot configuration. Then the rear support section is lowered to raise the rear main frame section to a higher elevation to raise the boat in the body of water. Then the apparatus is moved to carry the boat in a direction from the body of water.

Also in the method of the present invention, the boat can be launched from a land location into the body of water, and this is accomplished in substantially the reverse order of the method of retrieving the boat from the body of water. More specifically, the boat is located on the apparatus, and the apparatus is moved into the body of water. Then the rear main frame section is located at a lower ground elevation in the body of water, with the rear support section in its upper configuration and the main support frame in its lower pivot configuration so that the boat is substantially supported by a flotation force of the water.

BRIEF DESCRIPTION OF THE DRAWINGS

FIGS. 4, 5, 6 and 7 are views showing the apparatus used in the method of the first embodiment of the present invention in various configurations where the rear support section is in its upper configuration or lower configuration and the main frame is in its upper pivot configuration or lower configuration;

FIG. 8 is a top plan view of the apparatus used in the method of the first embodiment of the present invention;

FIGS. 9A and 9B are two schematic top plan views showing only the rear support wheels and front steerable support wheels used in the method of the first embodiment of the present invention and illustrating the FIG. 9A, the turning of the wheels, and in 9B the travel of the front wheels in a lateral direction;

DESCRIPTION OF THE EMBODIMENTS

A) A Description of the Method of the First Embodiment

Figure 1:
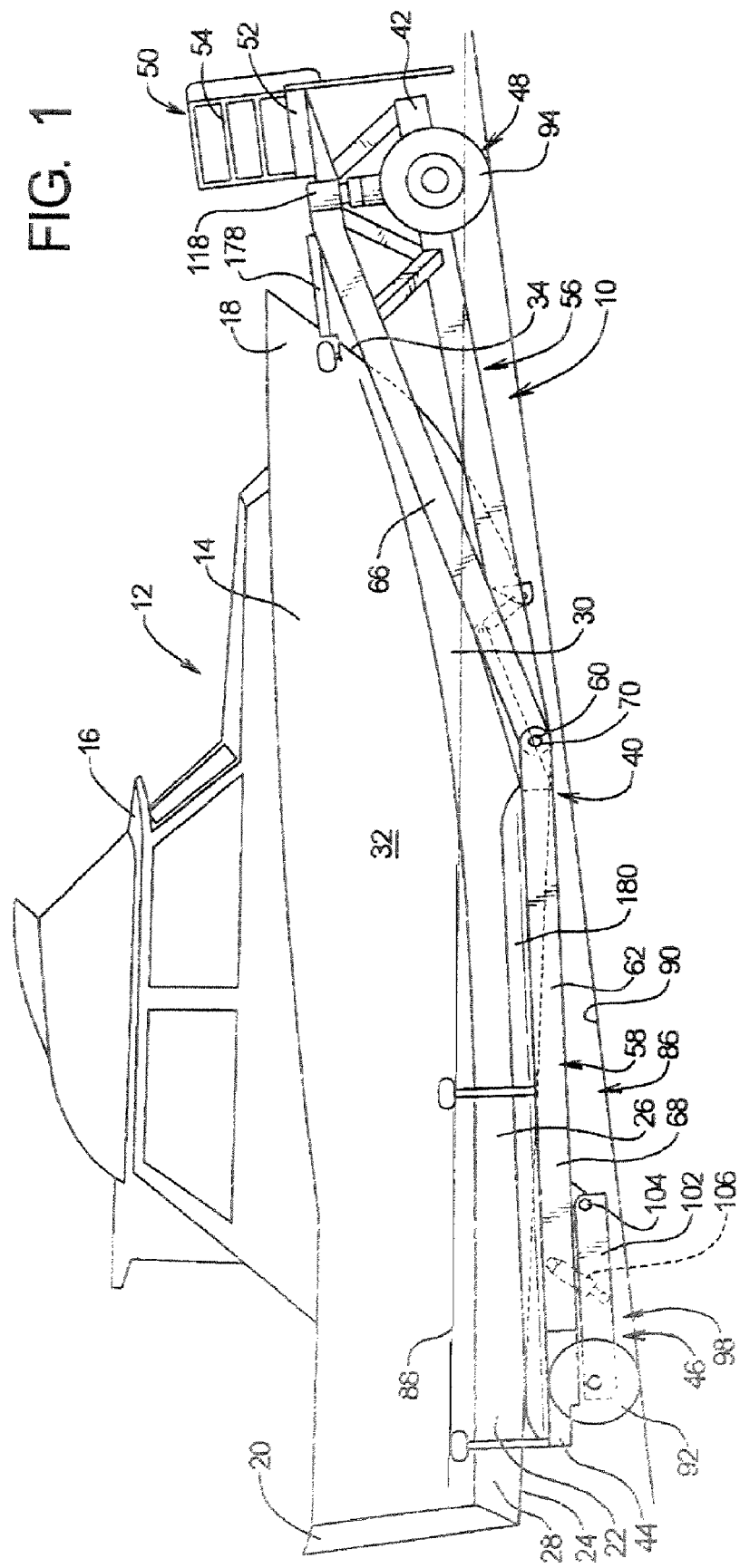
FIG. 1 is a side elevational view of the apparatus which is used in the first embodiment of the method of the present invention in an operating position in a body of water with a boat positioned so as to be ready to be retrieved from the body of water.
Figure 2:
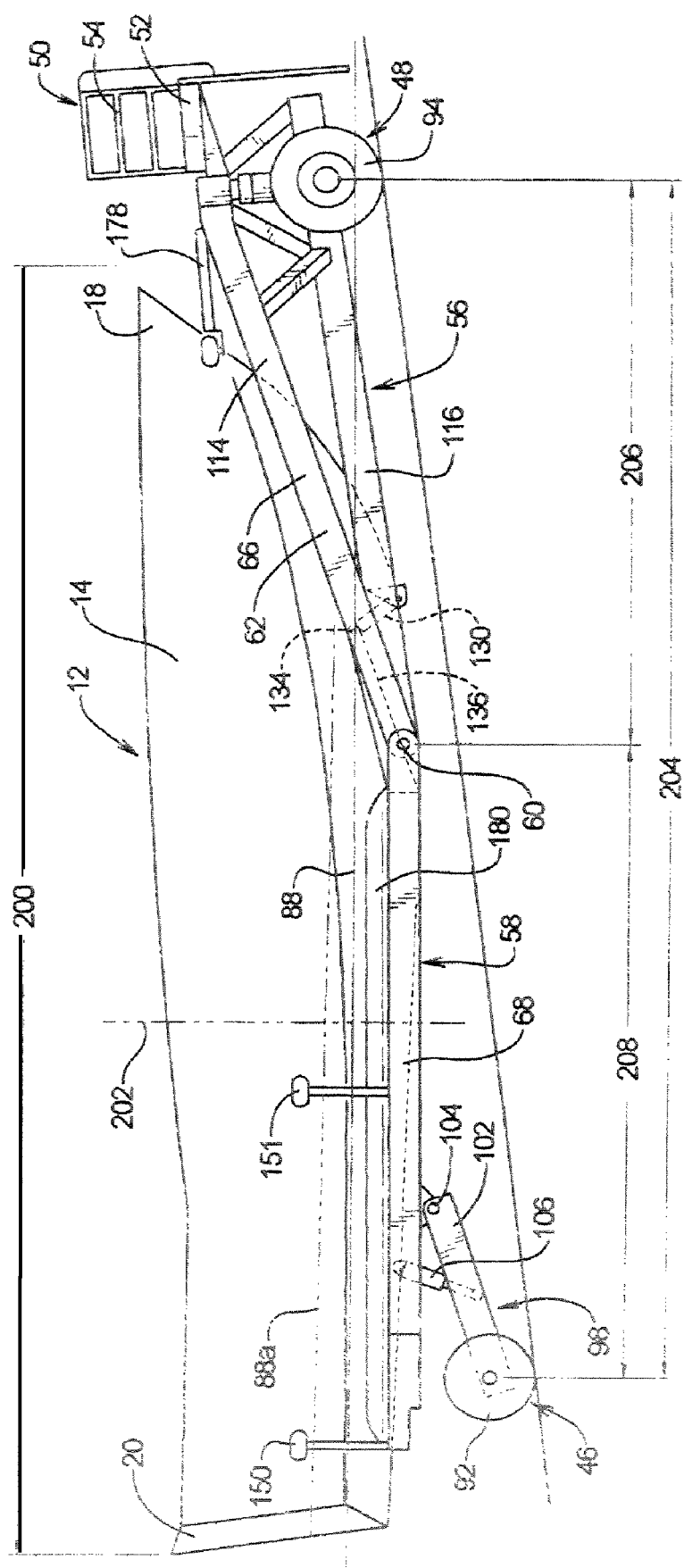
FIG. 2 is a view similar to FIG. 1, but showing the rear main frame section being raised to partially lift the boat from the body of water.
Figure 3:
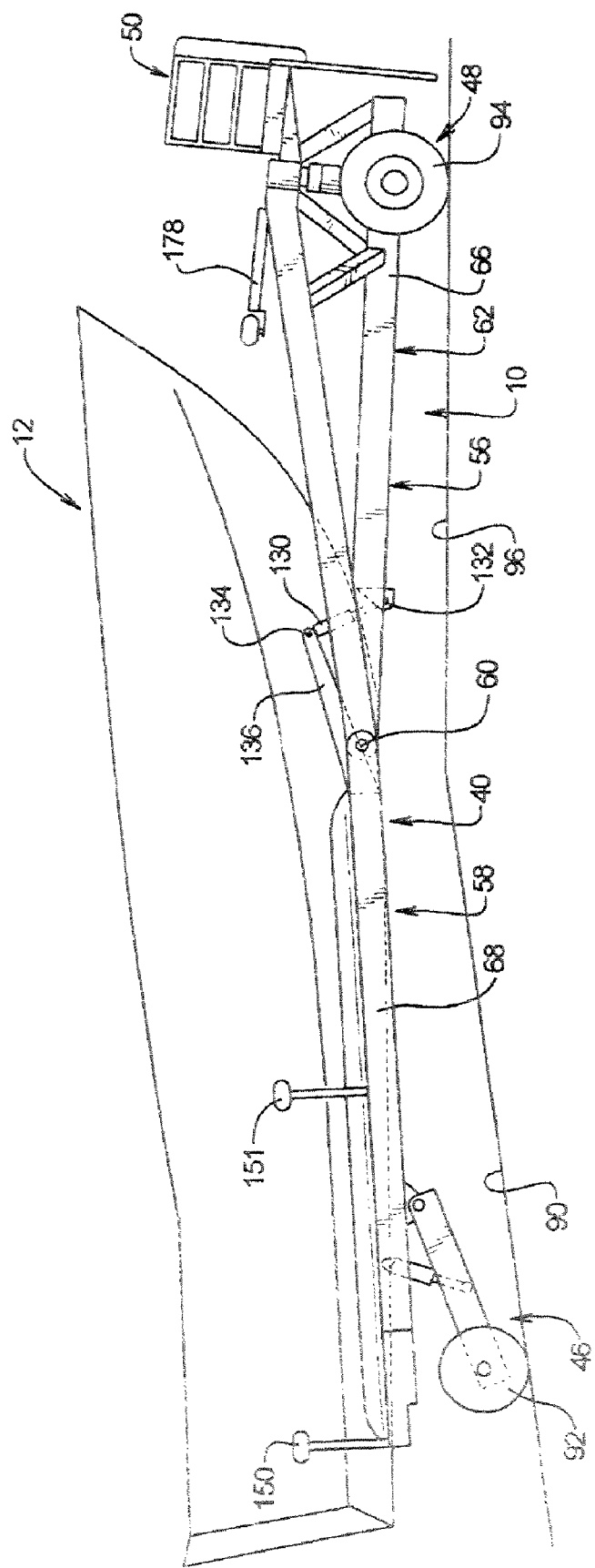
FIG. 3 is a view similar to FIGS. 1 and 2, but showing only the hull of the boat, and showing the boat being carried out of the water.
Figure 13:
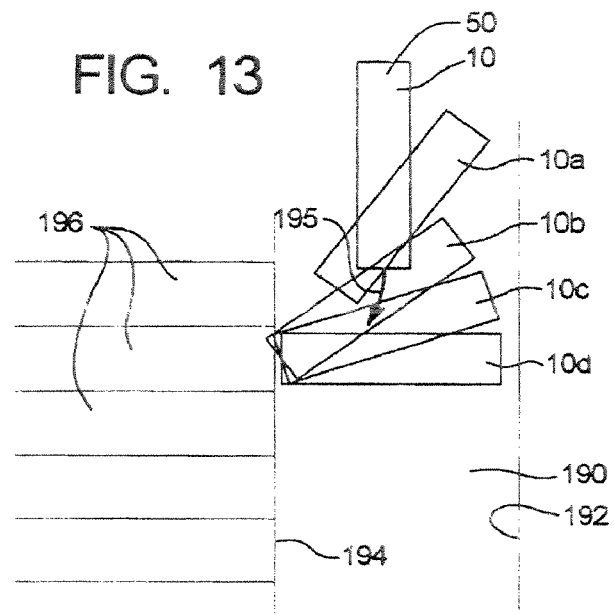
FIG. 13 is a schematic top plan view illustrating the manner in which the apparatus used in the method of the present invention can be moved into a storage slot in a marina.

In FIG. 1, there is shown a boat transport/launching apparatus 10 which is used in the method of the first embodiment of the present invention where the boat 12, is positioned relative to the apparatus 10 to be carried out of a body of water. As will be discussed later herein, in this first embodiment of the method this apparatus 10 is able to carry the boat 12 into the water to launch the boat, carry the boat out of the body of water (as is shown in FIGS. 2 and 3), and also to carry the boat over the land surface as in parking the boat in a location in a boat yard (as illustrated in FIG. 13). For convenience of description, the apparatus 10 will simply be referred to as the "transport apparatus" in the following text.

It is believed that an understanding of the present invention will be better obtained by describing the method of the invention in the following format. First, there will be a general description of the transport apparatus 10 which lifts and transports the boat 12, second a preliminary description of the basic operation of the apparatus 12 in the method of the present invention with reference to FIGS. 1, 2 and 3, third a more detailed description of the apparatus 10, along with a discussion of various facets of the method of the first embodiment of the present invention, along with possible alternatives, and fourth a brief description of a second embodiment. Later in this text there will be a description of the method of a third embodiment, along with a description of the apparatus used in that third embodiment.

a) General Description of the Transport Apparatus 10 Used in the Method of the First Embodiment.

In the method of this third embodiment, the apparatus 10 is particularly well adapted to be used for a boat having a hull configuration of a cabin cruiser of more or less conventional design as shown at 12, and accordingly in the following description, the boat 12 which is being carried will be assumed to be such a cabin cruiser. However, it is to be understood that within the broader scope of the present invention, the methods employed would also be adapted to handle boats of other configurations.

There will first be an introductory description of the overall configuration of the boat 12 (i.e., a conventional cabin cruiser). This boat 12 comprises a hull 14 and a cabin structure 16 (shown only in FIG. 1 for ease of illustration). The boat has a bow 18, a stern 20, and a hull bottom surface 22. There is a center keel line 24, and the bottom hull surface 22 comprises right and left bottom surface portions 26 on opposite sides of the keel line 24. Further, each bottom surface portion 26 can be considered as having a rear bottom surface portion 28 and a forward bottom surface portion 30. As is conventional with this type of cabin cruiser the side walls 32 of the hull are spaced further from one another in the rear portion of the boat 12 and converge toward one another in the forward part of the boat 12 to meet at a front juncture line (a prow line 34). In like manner the bottom surface portions 26 become narrower and have a greater upward and lateral slant at its forward portion.

The transport apparatus 10 in this method of the first embodiment of the present invention comprises a main frame 40, having a front end 42 and a rear end 44, a rear wheeled support section 46, a front wheeled support and steering section 48, and an operating section 50, having an operating platform 52 and a support rail 54 surrounding the platform 52.

To describe the main frame 40 in more detail, the frame 40 has a front frame section 56, and a rear frame section 58, with these being joined to one another at a pivot location 60 which is approximately at the mid-length of the frame 40. Also, in terms of function and structure the frame 40 can be considered as having (as seen in FIG. 8 in plan view), an overall U-shaped configuration, comprising a forward frame portion 61 and right and left side frame portions 62 and 64, respectively. Further, each of these side frame portions 62 and 64 has a forward side frame portion 66 and a rear side frame portion 68, with each pair of front and rear side portions 66 and 68 being connected to one another by means of a respective pivot connection 70 at the pivot location 60. The forward side frame portions 66 connect to one another by means of the forward frame portion 61 which is part of the front frame section 56. Also the two forward side frame portions are part of the front frame section 56, and the two rear side frame portions comprise the rear frame section 58.

The frame 40 can be considered as having a longitudinal center axis 72 extending the length of the apparatus 10, and also a transverse axis 74, which for purposes of description will be considered being located at the pivot location 60.

The frame 40 has a boat receiving region 76 extending substantially the entire length of the frame 40, and comprising a rear entry portion 78, a rear receiving region portion 80 located between the rear side frame sections 68, and a forward receiving region portion 82 located between the forward side frame section 66.

b) General Description of the Operation of the Apparatus 10 in the Method of the First Embodiment.

With the basic configuration of the transport apparatus 10 being given, we will now proceed to the next phase of this description, with reference to FIGS. 1, 2 and 3 and describe the basic method of the present invention in taking the boat 12 out of the water.

Reference is now made to FIG. 1. Let us assume that the boat 12 is already floating in a body of water indicated at 86, and having a water surface 88, and it is now desired to take the boat out of the water at the location of a more or less conventional slanted launching ramp having an upwardly facing slanted ramp surface 90. Initially, the transport apparatus 10 is backed downwardly along the ramp surface 90 into the water 86 with the rear wheeled support section 46 in a retracted position so that the rear end of the rear frame section 58 is at its lowermost position. Further, the front and rear frame sections 56 and 58 have been rotated relative to one another about the pivot location 60 so that the pivot location of the frame 40 is at its lowermost position so as to be proximate to the ramp surface 90. With the transport apparatus 10 being in the configuration as shown in FIG. 1, the boat 12 is then operated to move the boat through the rear entry 78 and into the boat receiving region 76. The boat shown in FIGS. 1-3 is a relatively large boat 12 having an overall length as great as (or possibly even greater than) the entire frame 40. As will be discussed hereinafter, the apparatus 10 is capable of handling a boat of larger length (as shown in the drawings), and also a boat of substantially shorter length.

The boat 12 is moved forward in the boat receiving region 76 until the rear portion of the boat is located in the rear receiving region portion 80 and the forward portion of the boat is located in the forward receiving region portion 82. In this position, as shown in FIG. 1, the boat is still entirely supported by the flotation force of the water, or is substantially fully supported by the flotation force in the water.

The next step is shown in FIG. 2, and this is to lower the rear wheeled support section 46 so that the rear support wheels 92 of the rear wheeled section 46 are moved downwardly to lift the rear end of the frame 40 upwardly in a rotational movement about the front wheels 94 of the forward wheel support and steering section 48. The front and rear frame sections 56 and 58 are held in a fixed angular position during this operation as the entire frame 40 is lifted. Alternatively these can be accomplished with possibly a moderate adjustment in the angular position of the two frame sections 56 and 58 for proper clearance or other reasons.

In FIG. 2, there is shown a horizontal line indicating the level of the water surface at 88 with the boat 12 in the raised position in FIG. 2. Also, there is shown in a broken line at 88*a* the water level relative to the boat when the boat was still afloat in the location of FIG. 1. In the position of FIG. 2, a bottom part of the boat hull 14 is still in the water to provide a certain amount of a buoyancy force, but there is sufficient proportion of the weight of the boat pressing against (and being supported by) the rear frame portion 58 so that the transport apparatus 10 in moving out of the water, is able to move the boat 12 out of the water. Alternatively the boat 12 could be lifted totally out of the wafer in reaching the position of FIG. 2, but there would normally not be any advantage in doing so initially.

In FIG. 3, the boat 12 has been moved up the ramp 90 and completely out of the water, and the rear support wheels 92 are positioned on the more forward location of the sloping ramp 90. The front wheels 94 are shown as being on a level ground surface 96. Further, it can be seen that the alignment of the forward and rear frame portions 56 and 58 has been changed moderately by relative rotation about the pivot location 60, and this could be done, for example, to obtain sufficient clearance from the ground surface as the transport apparatus 10 is moving from a slanted surface to a more level surface.

From the above description, it becomes evident that to launch the boat back into the water, the reverse of the above sequence shown in FIGS. 1, 2 and 3 is accomplished. More specifically, the apparatus 10 and the boat 12 are moved to the location of FIG. 3, and the apparatus 10 moved rearwardly to the launch location of FIG. 2. From the launch location of FIG. 2, the rear wheeled support section 46 has the rear wheels 92 raised to lower the rear portion of the main frame 40, thus putting the boat in the floating position of FIG. 1.

c) More Detailed Description of the Transport Apparatus 10 Used in the Method of This First Embodiment.

To describe the various components of the apparatus 10 in more detail, we will begin first by looking at the rear wheeled support section 48. It can be seen in FIG. 8 that the rear wheel support section 46 comprises right and left rear wheel support sections 98 and 100, each of which comprises its related rear wheel 92 mounted to a related support arm 102 which in turn is pivotally connected at 104 at its forward end to its related rear side frame section 68. There is an actuator 106 (e.g., a piston and cylinder hydraulic) connected between its related arm 102 and its related rear frame portion 68 to extend in a manner to lower each wheel 92 or to contract to raise the wheel 92. It is evident that in the method of this first embodiment there could be other actuators in the form of one of a wide variety of mechanisms or devices to accomplish this lifting or lowering function, such as lifting jacks, extendable and retractable linkages, articulated lifting mechanisms, etc. Since such alternative methods are well known to those having reasonable skill in the mechanical arts, these will not be described in detail herein.

Attention is now directed to the forward wheel support steering section 48. The two front wheels 94 are spaced laterally from one another at the front end of the frame 40, and each wheel 94 is mounted for rotation about its own vertical steering axis 108 which is shown schematically in FIG. 8 as being immediately over the center location of its related wheel 94. Thus, as can be seen in the schematic showings of FIGS. 9A and 9B, the two front wheels 94 can be rotated in either direction a full ninety degrees so that the alignment of the direction of the rolling path of the wheel is at ninety degrees to the longitudinal axis 72, as illustrated by the arrows 110 shown in FIG. 9A. In the position of FIG. 9B, the wheels 94 are aligned so that movement of the forward portion of the apparatus 12 is in a transverse direction ninety degree to the longitudinal axis 72, about a rear center of rotation indicated at 112 which is located in transverse alignment with the centers of rotation of the rear wheels 92. The significance of this in enabling the apparatus 12 to move very effectively, for example in a boat yard, will be discussed later in this text with reference to FIG. 13.

The steering of the front wheels 94 can be accomplished in a conventional manner by an operator positioned on the operating platform 52. Further, the front wheels 94 can be driven by suitable individual motors (e.g., hydraulic or electric motors), and since this can be done in a conventional manner, this will not be described in detail herein. Further, while the vertical axis of rotation 108 for each front wheel 94 is shown as being directly over the wheel 94, it could be offset slightly from its wheel 94 and function properly in the present invention. For example, there could be a vertical rotatably mounted support post offset from its wheel 94 and connecting to it wheel 94 through a suitable drive axle.

Let us now turn our attention to the main frame 40, and begin by discussing the forward frame section 56. The two right and left forward frame portions 66 that make up the forward frame section 56 are, or may be, identical, and each comprises an outer longitudinal frame member 114 and an inner longitudinal frame member 116. The forward ends of the outer frame members 114 are connected to one another by a cross member 118 at an upper location on the front frame section 71. It can be seen by observing, for example, any one of FIGS. 4-7, and also observing FIG. 8, that the alignment of the two frame members 114 and 116 is such that their rear ends are at the same transverse location at the same level at the rear pivot location 60, and that the two outer frame members 114 extend parallel with one another to the front location at an upper level of the forward frame section 71. On the other hand, the inner frame members 116 extend forwardly and converge at a slight angle inwardly in a forward direction, and also extend at a moderate downward angle relative to the orientation of the outer frame members 114. This forms a truss like structure to contribute to the overall structural strength of the entire front frame portion 56, and also this arrangement provides the proper clearance in the forward receiving region portion 82.

It is to be understood, of course, that there is proper structural bracing between the inner and outer frame members 114 and 116 as well as for the cross member 118, and at least some of this structural bracing is illustrated in FIGS. 4-7 and also in FIG. 8. For example, there is a pair of diagonal braces 120 extending between related frame members 114 and 116, and also diagonal braces at 122 and 124 extending between the forward portions of the inner frame members 116 that extend somewhat forwardly from the location of the front wheels 94 and of the cross member 118. In addition, there could be, for example, diagonal bracing extending between the central part of the cross member 118 in a rearward and horizontally outward direction to connect to the outer frame members 114 near the forward ends thereof. Also, it is to be understood that the mounting structure for the front wheels 94 would be such so that there would be proper structural bracing and also to make the proper connection with the front frame portion 56 so that the weight loads would be properly transmitted from the frame 40 through the structure to the front ground wheels 94.

With reference to FIG. 8, the rear ends of the two forward frame members 114 and 116 join to one another at the pivot connection 70, this pivot connection actually being made by the two separate pivot connections 126 and 128 that are transversely aligned with one another. There are two positioning actuators (i.e., hydraulic cylinder and piston members 130), each connecting by one end 132 to a cross strut between the frame members 114 and 116, and the other end connecting at 134 to a forward end of a positioning arm 136 that is connected by a cross brace 138 to the forward end of its rear side frame section 68. Thus, extension and retraction of the two cylinder and piston members 130 causes rotation of the positioning arm 136, thus causing relative rotation of the forward and rear main frame portions 56 and 58.

It is obvious that there could be other mechanisms actuators, linkages and devices to provide relative rotation between the frame sections 56 and 58, such as crank arms rotary actuators, gear drives, etc. Since these are numerous and well known to those of reasonable skill in the mechanical arts, these will not be described in detail herein.

To describe now the rear frame section 58 in more detail, reference is again made to FIG. 8. It can be seen that the rear frame section 58 actually comprises the aforementioned right and left rear frame portions 68. It can also be seen from observing FIG. 8 that these two rear frame portions 68 can each rotate independently of one another about the pivot connections 126 and 128. Each of these rear frame portions 68 comprises outer and inner frame members 144 and 146 interconnected by suitable cross braces some of which are indicated at 148.

There are two rear guide members 150 and two forward guide members 151 (boat positioning members) which are located at side portions of the rear frame portion 58. The two rear guide members 150 are positioned at the rear end of the rear frame portion 58, and these are shown in elevational view in FIGS. 11A and 11B. Each forward guide member 151 (shown in FIGS. 12A and 12B) comprises a cushioned roller 152 mounted to the top end of a right angle mounting arm 154, with this arm 154 having an upright arm portion 156 and a lateral end arm portion 158 with the inner end of the arm portion 158 being rotatably connected to a rotary mounting section 160 that is in turn connected to the related outer frame member 144. A spring positioning member is provided, as shown at 161, to urge the cushion member 152 toward the longitudinal center axis 72.

Figure 11A:
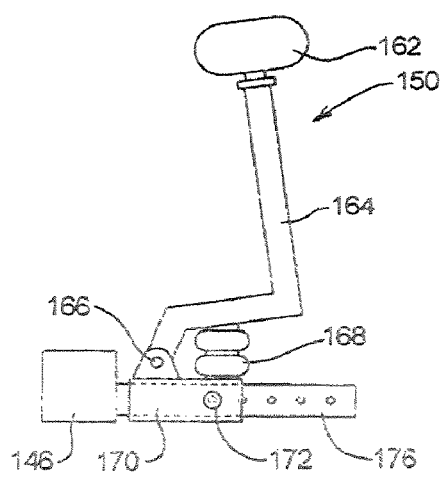
FIGS. 11A and 11B are elevational views showing one of two positioning members used in the first embodiment of the method of the first embodiment of the present invention, in two different positions.
Figure 11B:
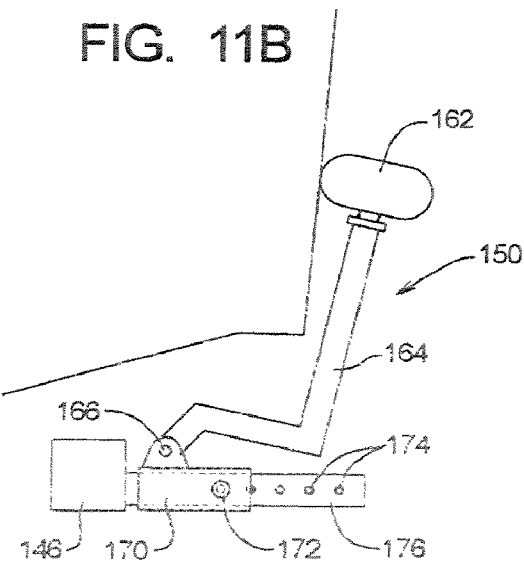
Figure 12A:
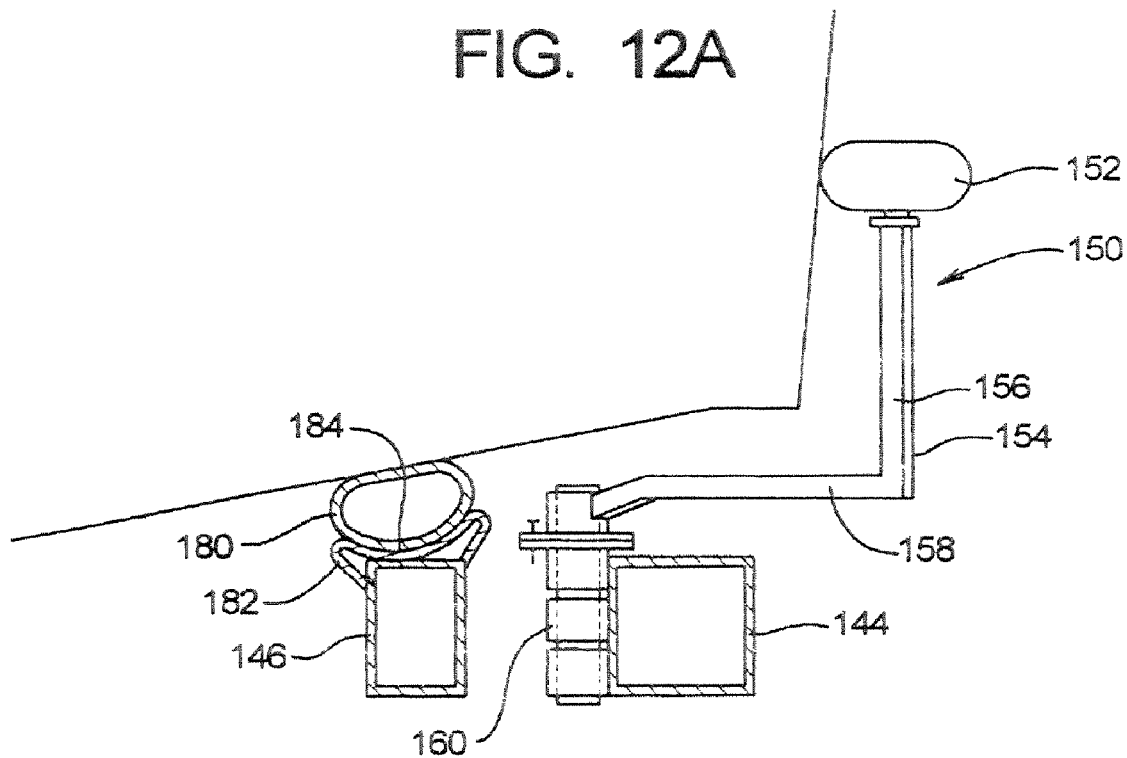
FIG. 12A is a view partially in section, and is taken from a rear location, showing another side positioning device used in the first embodiment of the method of the present invention.
Figure 12B:
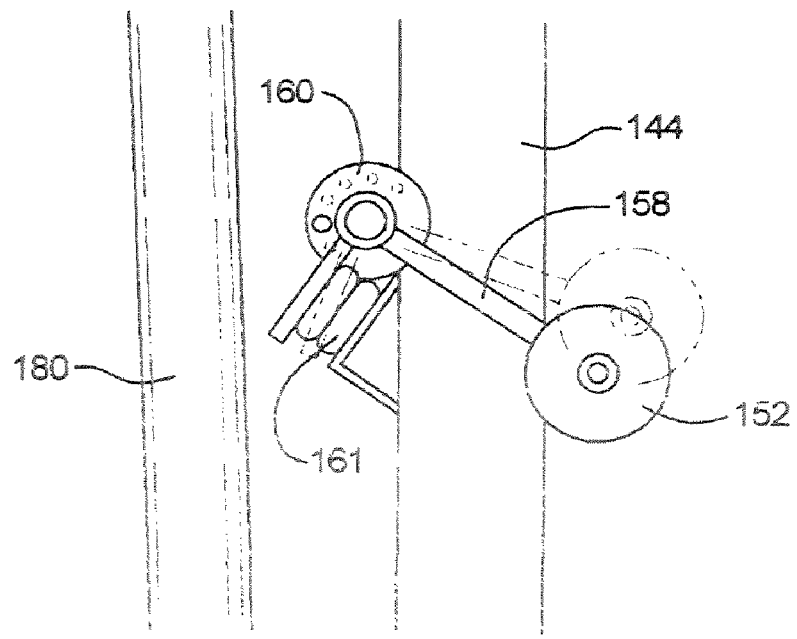
FIG. 12B is a view of the positioning device of FIG. 12A, but taken from an upper location looking downwardly on the device of FIG. 12A.

One of the two rear guide members 150 is shown in FIGS. 11A and 11B, and it can be seen that in like manner this comprises a cushion roller 162 connected to a right angle member 164 which in turn is pivotally connected at 166 at the rear end of the inner frame member 146. The pivot connection 166 is aligned longitudinally, and there is a positioning spring 168 (shown only in FIG. 11A) positioned beneath the horizontal portion of the right angle arm 164 to urge the arm 164 inwardly. Also, the pivot connection of the arm 164 is to a sleeve member 170 which has a positioning pin 172 which can be mounted in a selected one of the positioning openings 174 and a mounting member 176. Thus, the lateral positioning of the two guide members 150 can be adjusted laterally by proper positioning of the sleeve member 170.

In like manner forward positioning members 178 can be provided and be constructed in a manner similar to the guide members 150 and 151.

A significant feature in the method of the present invention will now be described with reference to FIGS. 8, 1A, 10B, and 12A. First, with reference to FIG. 8, to support the boat 12, there are two substantially identical inflated bunker members 180, each extending the entire length of its related frame member 146. One of the inflatable bunker members is shown in the cross sectional view of FIG. 12A, where it can be seen that the frame member 146 is provided with an elongate cradle 182 which has a uniform-cross section extending the length of the frame member 146. This cradle 182 can be made as a metal extrusion, and defines an upwardly facing curved concave cradle surface 184. Each inflatable bunker member can be secured in the cradle 182 in a suitable manner such as bonding, mechanical fasteners, etc.

Figure 10A:
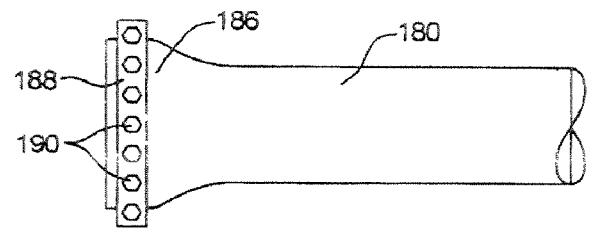
FIG. 10A is a first view of an end portion of the one of the inflatable bunkers used in the embodiments of the method of the present invention.
Figure 10B:
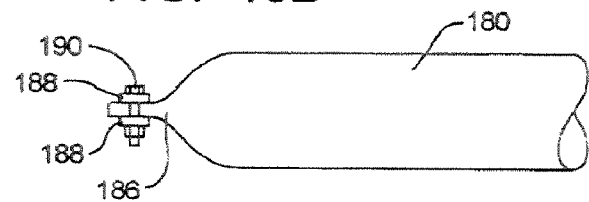
FIG. 10B is a second view of the end portion of the bunker, shown in FIG. 10A, taken from the location which is 90° from the location in which 10A is being taken.

Reference is now made to FIGS. 10A and 10B which illustrate the end closure portion of the inflatable bunker 180. It can be seen that the end portion 186 is flattened, and there is positioned above and below the flattened portion 186 clamping plates 188 held together by a plurality of spaced nut and bolt connections 190. A suitable sealant can be placed at the end clamping location to ensure that there is an airtight seal. Suitable inflating and venting means can be supplied in the way of a typical air valve so that the proper pressure can be maintained in each of the inflatable bunkers 180. It has been found that the use of these inflatable bunkers 180 in the method of the embodiments of the present invention has a number of advantages. First, the cushioning action of each of the bunkers 180 is such so that the compressed upper surface areas of each bunker 180 are maintained at the same air pressure throughout. Thus, each unit of the contact area of the bunker 180 exerts a substantially uniform pressure against the engaged portion of the bottom surface of the hull 14. Also, as the transport apparatus 10 is moved over a ground surface, any impacts created by holes or bumps in the ground surface are substantially alleviated by the cushioning effect of these inflatable bunkers 180.

To now discuss another facet of the method of the present invention, reference is made to FIG. 13 which is a rather schematic view showing the outline of the transport apparatus 10 which is positioned in a corridor 190, this corridor is bounded on two sides 192 and 194 by parking slots or stalls for boats and/or trailers or supports. In the schematic drawing in FIG. 13 the transport apparatus 10 is shown as an elongate rectangle 10, and the trailer is moving in the direction indicated at 195 with the forward end (i.e., the operating end) being shown at 50. It can be seen that the transport apparatus 10 can be turned in a path of travel indicated in the several broken line representations of the apparatus 10 location at 10a, 10b, 10c and 10d so that it can be placed into one of the slots indicated at 196. Further, it can be seen that the spacing of the two corridor sides 192 and 194 could be nearly the same as (or just slightly greater than) the total operating length of the transparent apparatus 10 plus the portion of the boat that may be overhanging the back end of the apparatus 10.

To discuss other features of the method of the present invention reference is now made to FIG. 2. In a conventional cabin cruiser, such as shown at 12, the center of gravity would be at a position moderately to the rear of a longitudinal center location of the cruiser. To explain this further, the total dimension from the bow to the stern of the cruiser 12 is in FIG. 2 shown by the line 200. Let us assume that the distance from the stern 20 to the bow 18 is 100%. In that instance, the center of gravity would usually be at the 40% location from the stern 20, indicated at 202. Now we turn our attention to the total length dimension between the center of the rear wheels 92 and the center of the front wheels 94, these being the two support locations, and this dimension is shown at 204. Let us assume that this dimension 204 is also considered to be 100%, with the location of the center of the rear wheels 92 being 0% and the center of the front wheels 94 being 100%. The pivot location 60 would be approximately half way between the two end support locations of the wheels 92 and 94, and in one preferred embodiment where the distance between the center of the front and rear wheels 92 and 94 is forty two feet, this pivot location 60 is at the 53% location measured from the center of the rear wheels 92.

In this particular embodiment of the method of the present invention, the distance between the center of the front wheels 94 to the pivot location 60 is 19.5 feet, and the distance from the center of the rear wheels 92 to the pivot location 60 is 22 feet. These relative dimensions could be adjusted for various reasons, depending upon the size and type of boat which is being carried by the transport apparatus 10 the configuration of the boat ramp which is used etc. In general, the pivot location 60 between the front and rear support locations of the wheels 92 and 94 would be between the 50-55% location from the stern 20, with this percentage value possibly being as high as up to 60% or up to possibly 65% or conceivably as high as about 70% or 75%. An upper reasonable limit would be no greater than a limit having the ratio length of the rear distance (the center of the rear wheels to the pivot location 60) to the forward distance (from the pivot location 60 to the center of the front wheels) no greater than about three to one. The distance from the center of the rear wheels 92 to the pivot location 60 would possibly be at the 45% distance or even 40% distance from the stern 20, with the reasonable lower limit being one-third of the total distance from the center of rear wheels 92 to the center of the front support wheels 94.

To relate this analysis to the operation of the method of the present invention, it can be seen that with a relatively large boat 12 resting on the main frame 40, the center of gravity at 202 is positioned on the rear frame portion 58 at a location intermediate the pivot axis 60 and the rear wheels 92. Thus, the boat is supported by its rear portion resting on the inflatable bunkers 180, and the forward portion of the boat 12 extends into the forward receiving region 82 between the forward side frame members 66.

If a smaller boat is being either launched or removed from the water by the transport apparatus 10, then the total length of the boat could possibly be accommodated entirely by the rear frame portion 58. Thus it can be seen that in this embodiment of the method of the present invention the arrangement of the transport apparatus 10 is such that relative to overall length of the entire transport apparatus 10, it is possible that much larger boats (which heretofore have been removed from and placed into the water by means of a hoist) could be handled, as well as the smaller boats. Also, as indicated previously, this can be done so that a relatively large boat 12 can be maneuvered in a relatively small space and moved into a storage slot in a marina.

To explore yet another facet of the method of the present invention, reference is made to FIGS. 4-7. It can be seen that the rear frame portion 58 has what could be termed a boat support plane indicated by the numeral 210. In this particular configuration, the boat support plane would be the planar alignment of the support surface of the bunker members 180. For convenience of illustration, in FIGS. 4-7, this support plane 210 has been shown as extending over the top surface of the inner rear frame members 146. Related to this analysis is the ground support alignment plane 212 of the underlying ground support plane relative to the support plane of the rear frame portion 58. Thus, in FIGS. 4-7 the ground support reference plane 212 is defined by the ground engaging portions of the rear and front wheels 92 and 94. This ground support reference plane 212 is defined by the locations of the ground engaging support at the front and rear ends of the apparatus.

Reference is first made to FIG. 4, where the pivot location 60 is at its lowermost position, and the rear wheels 92 are in the retracted position. It can be seen that the alignment plane 210 has a very slight downward and forward slope, and the angular orientation relative to the support surface 212 is at an angle of about four degrees, indicated at 214. In FIG. 5, the rear wheels 92 have been moved downwardly to their lowermost position, and the angular orientation of the front and rear frame sections 58 and 56 remains the same. In this instance, the slope of the support plane 210 relative to the ground surface 212 is about six degrees, as indicated at 216.

In FIG. 6, the forward and rear frame sections 56 and 58 have been rotated relative to one another so as to raise the pivot location 60, and the orientation of the support plane 210 is nearly parallel to the lower support surface 212.

In FIG. 7, the orientation of the front and rear frame portions 56 and 58 remain the same as in FIG. 6, but the rear wheels 92 have been retracted. In this instance, the support plane 210 of the rear frame portion 58 is at a forward and upward slope of about two degrees, as indicated at 218.

To comment further on the above observations made with regard to the angular disposition of the rear support frame portion 58, it should be noted that in the configurations of FIG. 4 and FIG. 5 correspond to the positions shown in FIGS. 1 and 2, respectively, where the rear frame portion 58 would normally be positioned on the sloping ramp and in the water. Further, in the configuration of FIG. 6 this would be a usual configuration when the transport apparatus is being moved from the ramp onto level ground (as shown in FIG. 3) or entirely on a ground surface that is not beneath the water. The configuration of FIG. 7 could be used in a variety of situations, one of which is where the downward and rearward slope is desired where the frame portion 58 is on a ground surface when it is desired to drain the boat hull 14 of water.

Obviously, these various alignment relationships could vary from the values give above, and this could depend on the slope of the ramp surface and the slope and contour of the ground in the marina. With regard to the alignment in the configuration alignment angle in the operating arrangement of FIG. 4, this could be at an angle greater than zero degrees or greater than two degrees, and on the higher side could, depending upon the situation, be six degrees, eight degrees or ten degrees.

In the configuration of FIG. 5 the angular relationships discussed above with reference to FIG. 4 would apply, but the range could be greater depending on the slope of the ramp.

With regard to the configuration of FIG. 6 where the support plane 210 is nearly parallel to the support surface 212, this angle could also vary by one degree increments up to conceivably ten degrees (e.g., one degree, two degrees . . . ten degrees) either upwardly or downwardly. In general, there would not be any great advantage in going up to these limits, but there could be particular situations where there would be advantages.

With regard to the operating configuration shown in FIG. 7, the two degree downward and rearward slope could obviously be decreased slightly, or it could be raised by various increments, such as one degree increments from three degrees, four degrees . . . up to ten degrees. This could occur for example, if the underlying ground surface is sloped to some extent. Alternatively, it may be that for certain boats the angle needs to be somewhat higher to cause proper drainage of the water in the hull.

Figure 14:
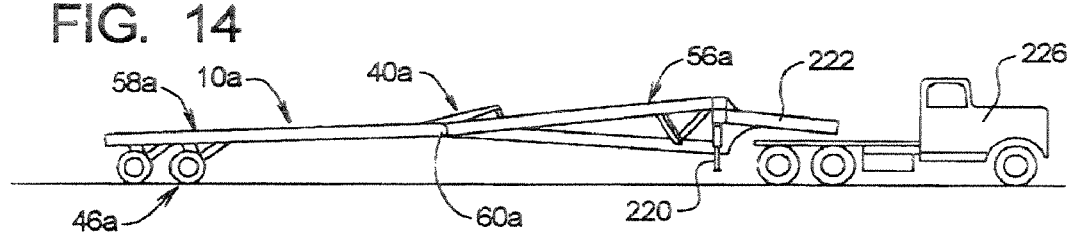
FIG. 14 is a side elevational view of an apparatus used in the method of a second embodiment of the present invention where the apparatus is being towed by a tractor.
Figure 15:
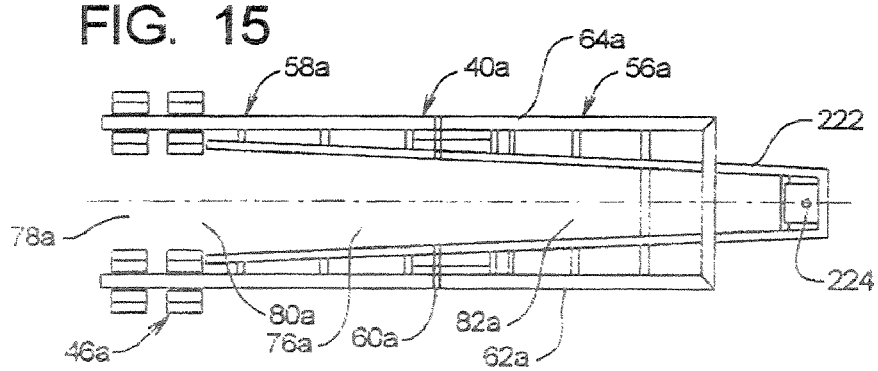
FIG. 15 is a top plan view of the apparatus of FIG. 14.

B. Description of a Second Embodiment of the Method of the Present Invention Reference is made to FIGS. 14 and 15 which show the apparatus used in the method of a second embodiment of the present invention. Components of the apparatus used in the method of this second embodiment which are the same as, or similar to, components of the method of the first embodiment will be given like numerical designations, with an "a" suffix distinguishing those of the second embodiment.

The apparatus used in the method of the second embodiment differs from the apparatus used in the first embodiment in that the operating section 50 with the platform 52 has been removed and also the front wheel support section 48 has been removed. As in the method of the first embodiment, the transport apparatus 10*a* in the method of the second embodiment comprises the main frame 40*a* with the rear wheeled support section 46*a*. The main frame 40*a* in turn comprises the front and rear main frame portions 56*a* and 58*a*, with a pivot location 60*a*. In addition, the main frame comprises the right and left side frame section 62 and 64. Also, there is the boat receiving regions 76*a* with a rear entry 78*a* and the rear and front region portions 80*a* and 82*a*, with the front region portion 80*a* extending into the forward frame section 56*a*.

In place of the front wheel section 48 of the method of the first embodiment, in the method of the second embodiment there is provided a front support 220 extending downwardly from the forward end of the main frame 40*a*. This support 220 can simply be posts, or alternatively, these could also comprise wheels, such as the wheels 94 of the first embodiment, along with power for the wheels and also a mechanism for turning the wheels. These would be used in the event that the transport apparatus 10*a* would be moved independently of any towing vehicle.

In addition, there is a forward extension 222 fixedly attached to the front end of the main frame 40*a*, and this has a fifth wheel connection at 224. Thus, this could be carried by a tractor, as shown at 226, or another towing vehicle. Also, the forward part the main frame 40*a* could be provided with front jacks or other vertical actuators to raise or lower the front end of the main frame 40*a* to better enable the connection with a towing vehicle to be made.

It is believed the method of operation in this second embodiment is evident from the prior discussion of the operation of the first embodiment, so this will not be repeated at this location in this text.

C. A Description of the Method of the Third Embodiment of the Present Invention The method of the third embodiment of the present invention will now be described with reference to FIGS. 16 through 22B. The basic steps in the method of the third embodiment are fundamentally the same as the steps in the methods of the first and second embodiments. These basic steps shall first be described, and this will then by followed a more detailed description of the apparatus and components and their functions used in practicing the method of the third embodiment.

The boat which is being removed from the water, transported over a land surface, and launched in the method of the third embodiment, is or may be, the same as, or similar to, the boat 12 which is shown in FIGS. 1-3 of the method of the first embodiment. Accordingly, to avoid confusion, the boat which is being removed from the water or launched back into the water in this method of the third embodiment, will be distinguished by adding a "b" suffix to the numerical designations of the boat and its associated components.

Figure 19:
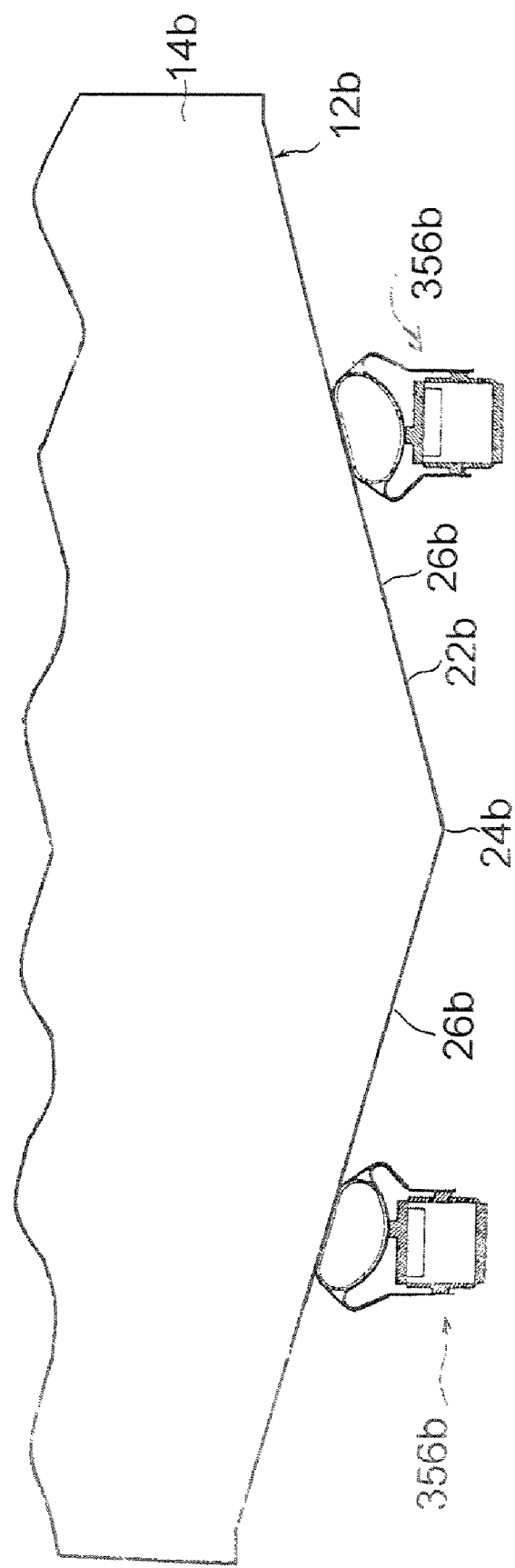
FIG. 19 is a view which shows only the bottom portion of the hull of the boat in cross-section taken in a plane perpendicular to the longitudinal axis of the boat showing the two cushioning sections in engagement with the bottom surfaces of the boat hull.

Thus, with reference to FIG. 19, the boat 12*b* comprises a hull 14*b* having a hull bottom surface 22*b* and with a keel line 24*b*. Further, the bottom hull surface 22*b* comprises right and left bottom surface portions 26*b* and 26*b* on opposite sides of the keel 24*b* which is considered as being a longitudinal front to rear center axis separating the right and left bottom surfaces. As shown herein, the two bottom surface portions of the boat are flat, and have an upward and outward slant (see FIG. 19).

a) Introduction to the Basic Method

As an introduction, there will now be a summary of the basic steps of the method of this third embodiment.

i) One of the early steps is to provide a pair of right and left elongate lift members which have sufficient structural strength to provide support for lifting a boat out of the water.

ii) As a second step, an elongate cradle structure is positioned on each of the lift members along a substantial length of the lift member as needed, and the method further comprises providing each cradle structure with an elongate recess having a middle lower surface portion with upwardly and outwardly sloping side cradle surface portions extending along at least a substantial length of said cradle structure.

iii) A third step is the positioning of an elongate inflatable bunker lengthwise in the recess of each cradle structure, with the cradle structure being capable of providing both lateral and vertical support for the inflatable bunker. Thus, there is provided what can be considered as right and left lift sections, each of which comprises at least the lift member, the cradle structure and the inflatable bunker.

iv) A fourth step is providing an operative engagement of the two lift sections to a mobile lift apparatus which has or is provided with at least one steerable wheeled portion.

v) As a fifth step, the mobile lift apparatus is positioned at a lift location which is at, or adjacent to, a body of water from which the boat is to be removed and the lift sections are positioned operatively connected to the mobile lift apparatus.

vi) As a sixth step, with the bunkers being inflated to a proper level, the two lift sections are positioned in the body of water at a lift location where the two lift members are arranged spaced laterally from one another to provide a boat receiving region. Also, the two bunkers are in an inflated condition so that these are at substantially the same pressure level that is maintained throughout at least a substantial portion of the length of the bunkers.

vii) A seventh step is the lift sections are raised to cause the inflated bunkers to engage the right and left bottom surfaces of the boat with the boat being lifted from the water.

viii) Then the mobile lift apparatus is operated to move the boat over a land surface to another location. For example, the boat may be moved to a location for storage, or the boat could be moved to a location to have maintenance or repair done on the boat, etc.

As indicated above, it is to be understood that while the eight steps which are recited above can be accomplished in the order in which they are presented, it would certainly be within the scope of this embodiment to possibly take some of the steps out of this order and/or locate these in different time frames. Also, two or more of these steps could possibly be combined into one step, or one step could be separated into two or more steps.

It is quite evident that the same method of the third embodiment described above also is the basic method used in the first and second embodiments. Also, some of the apparatus and/or components that are used in the methods of the three embodiments may differ from one another. For example, the transport components differ in all three embodiments, but the basic function of using a wheeled apparatus to move the lift section is present in all three embodiments.

In practicing the same method in the manner of the third embodiment of the present invention a forklift (which may be of conventional design), or other mobile apparatus having (or combined with) lift members may be used to perform the lifting functions to raise the boat out of the water, and also to accomplish the transport of the boat over a land surface. Accordingly, there shall now be a description of such an apparatus with reference to FIGS. 16 through 19, which shows a conventional forklift.

As shown herein, the forklift 310 comprises a body portion 312 which in turn comprises the chassis of the forklift 310. There are front and rear sets of wheels 314 and 316, with one of these sets of wheels being steerable wheels. At the forward end of the forklift body 312 there is an operating location 318 where the operator is positioned, and there is shown schematically a steering wheel. Other control instruments would also be at this location.

The forklift 310 comprises a lift assembly portion 320 which in turn comprises a pair of laterally spaced horizontally extending lift members 322 often called "forks". Each fork 322 has a vertical rear connecting portion 324. There is a lifting section 326 which comprises a vertical stationary lift structure 328 positioned at the front of the forklift body 312, and a lift mechanism 330 which lifts and lowers the forks (i.e., lift members 322). It is to be understood that the components 310 through 330 which have been described thus far are, or may be, of conventional design.

To proceed further with the discussion on the physical components that are utilized in the method of the third embodiment, in the description of the method of the first embodiment, two significant features are described, and these are the inflatable bunkers 180 and the two cradles 182. These same components are utilized in the method of the third embodiment (i.e., two inflatable bunkers 180 and two cradle structures 182, each having an elongate recessed cradle surface 184). To differentiate these from the same items which are used in the first two embodiments, in describing the steps of the method of the third embodiment there shall be a "b" suffix being used with the same numeral designations (i.e., 180, 182, and 184) and with other numerical designations relating to these components.

Figure 22A:
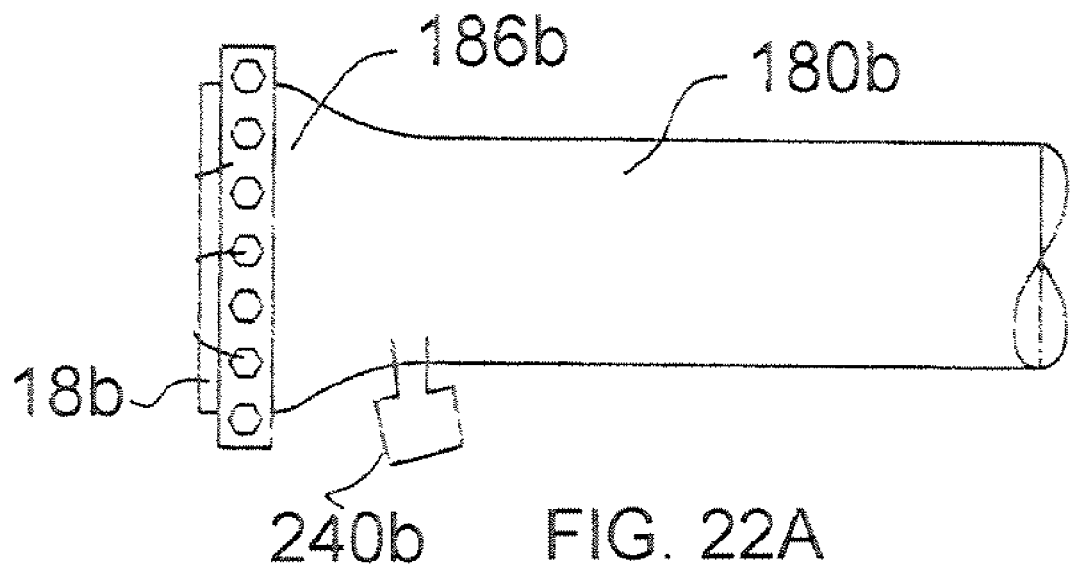
FIGS. 22A and 22B are views the same as, or quite similar to, FIGS. 10A and 10B of the method of the first embodiment.
Figure 22B:
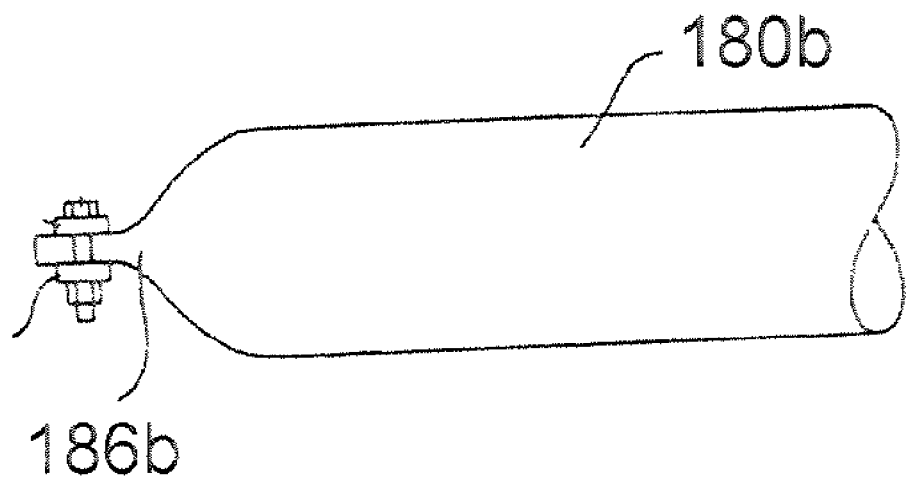

Thus, in the method of the third embodiment we have the inflatable bunker 180b, the cradle structure 182b, and the elongate recess 184b. The end portions 186b of each of the bunkers 180b are closed by flattening the end portion 186b by means of holding the end portion 186b in its clamped position by a pair of clamping plates 188b held together by, for example, a nut and bolt arrangement. An air valve 340b is shown somewhat schematically in FIG. 22A. This air valve 340b is used to increase or decrease the pressure in the bunker 180b or reduce the pressure. This is illustrated in FIGS. 22A and 22B. (It will be recognized that FIGS. 22A and 22B are the same as, or substantially the same as, what is shown in FIGS. 10A and 10B of the first embodiment.)

Figure 20A:
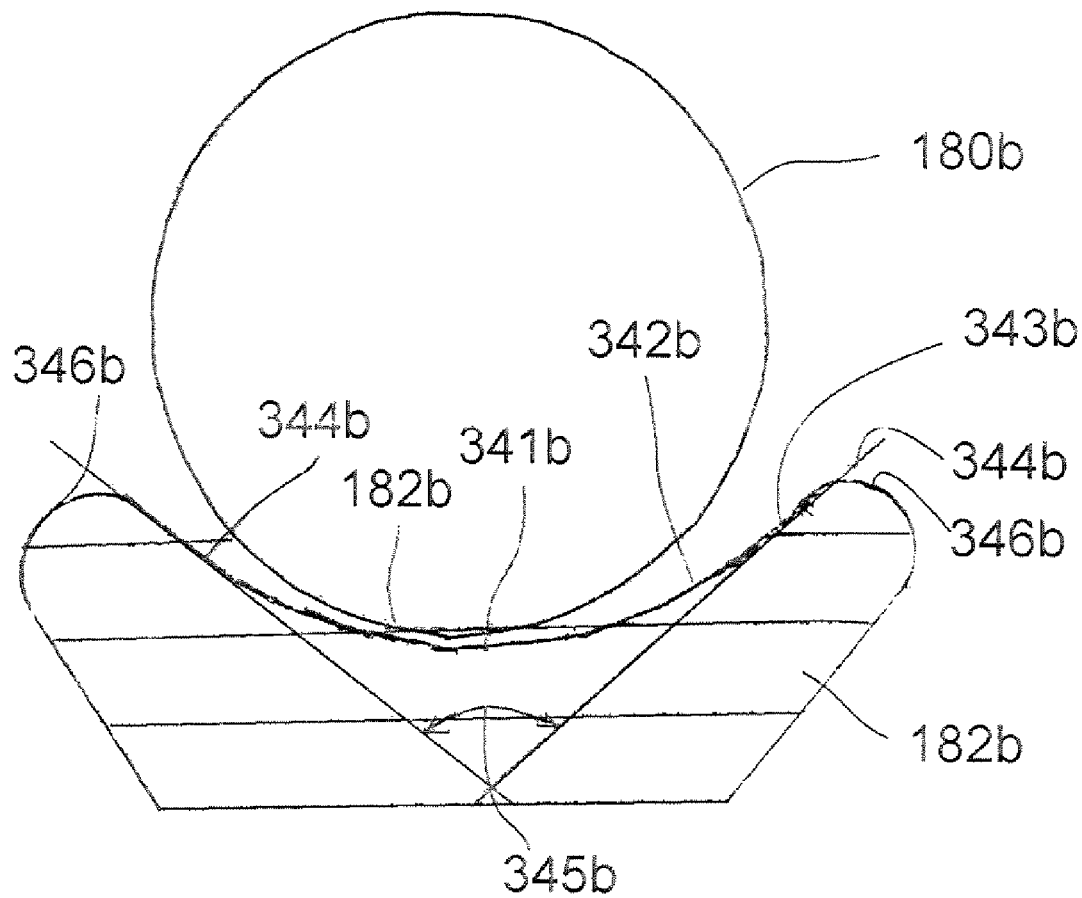
FIG. 20A is a schematic view of the bunker and the cradle structure when not engaging the boat hull.

To describe the manner in which the bunker 180b and the cradle structure 182b are used in the method of this third embodiment, and to describe further the arrangement of the inflatable bunker 180b, the cradle structure 182b, and also the cradle structure recess surface 184b, reference is made to FIG. 20A. With further reference to FIG. 20, the aforementioned cradle structure recess 184b is defined by an upwardly facing surface 184b of the cradle structure 182b, and this recessed surface 184b can be considered as having a lower middle surface portion 341b, and two upwardly and laterally extending curved surface portions 342b.

At the upper end portions of the curved surface portions 342b, the upwardly extending surface portions 342b each transition at a transition location 343b to an oppositely curved configuration. In FIG. 20A, a tangent line 344b is drawn from each transition location 343 in a slanted downward and inward direction with these meeting each other to form an angle 345b. This angle 345b is approximately a right angle, so that the two lines 344b slant away from each other upwardly and laterally at about a half of a right angle slant relative to a horizontal alignment plane. However, within the broader scope of the embodiments of the present invention, depending upon the circumstances, these particular angle relationships could be raised or lowered so that the half or right could be raised up to about two thirds of a right triangle or lowered down to about one third of a right angle. However, the outer transition locations 343b should be at a slant so that they would properly cradle the bunker 180b to provide lateral support.

This cradle structure 182b can (as mentioned earlier in this text with reference to the first embodiment) be made as an extruded or formed metal piece. It can be seen in FIG. 20 that the upper lateral end portions 346b are rounded in the form of a 180° curve, and the extrusion extends downwardly as two cradle structure downwardly extending sidewalls 348b, with two vertically aligned lower connecting wall portions 349b.

There is provided for each of the forks 322b (lift members 322b) a mounting adapter 350b which in cross section has a rectangular box-like configuration, providing top and bottom walls 352b and 354b and two sidewalls 356b which are rigidly connected with one another. These walls 352b, 354b, and 355b thus define an open mounting region to receive the lift member 322b. Also, the two sidewalls 355b attach to the lower connecting end portions 349b of the sidewall 348b.

Figure 20B:
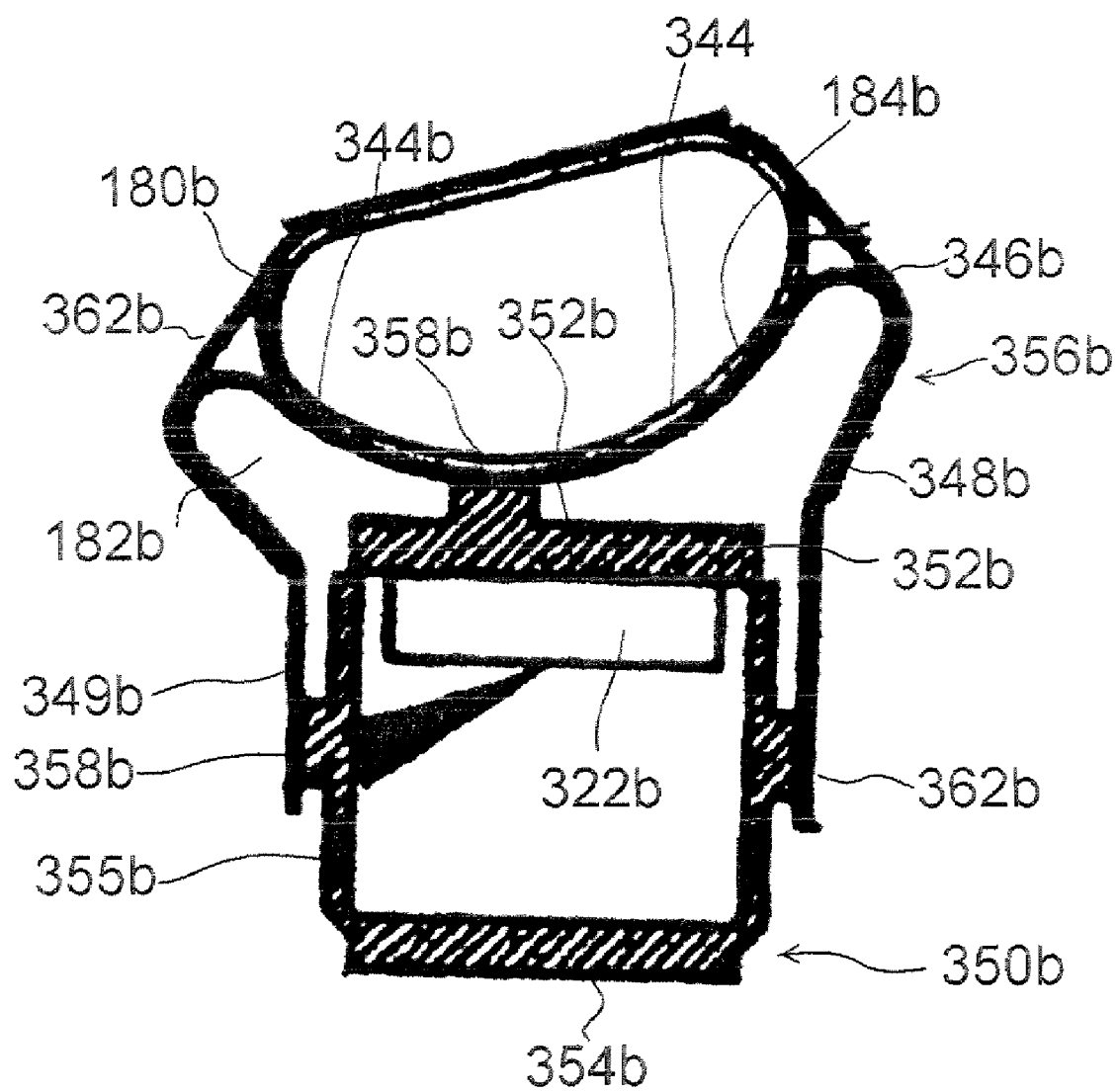
FIG. 20B is a front view of one of the lift sections which is used in lifting the boat, and which for purposes of illustration is drawn to an enlarged scale.

With reference to FIG. 20B, it can be seen that the bottom part of the two portions 349b 346b may be connected to the sidewalls 354b of the mounting adapter 350b by side attachment members 360b. Also, to retain the bunker member 180b in its operating position on the cradle structure 182b, there can be provided retaining straps 362b (FIG. 20B) which extend over the bunker member and with the end portions thereof being secured to the sidewalls 348b of the cradle structure 182b. The lower middle portion of the cradle structure forming the recess 184b has an attachment member 358b which is between the side walls 355 of the mounting adapter 350b and the fork 322b.

The components shown in FIG. 20B comprising the inflated bunker member 180b, the cradle structure 182b, the lift member 322 (which is the same as the forks 322b) and the mounting adapter 350b collectively define a lift section 356b by which the boat is lifted out of the water and transported over a land surface. With reference to FIG. 19, there are shown in an end view two of the lifting sections 356b extending substantially parallel to one another in a front to rear direction, supporting the opposite bottom wall surfaces 26 of the boat 12.

To proceed now to a description of how the boat 12b is lifted from the water, reference will be made to FIGS. 16-19. After this description of the method is completed, there will be further discussion of various aspects of the lift assembly 356b.

In assembling the two lift sections 356b, it is of course necessary to be sure that the inflatable bunker members 180b are brought to a pressure which is in an acceptable pressure range for the particular boat which is to be lifted. Also, if there are a wide variety of boats which would be either lifted from the water or launched, this should be taken into consideration, relative to such factors as the configuration of the hull itself, the weight of the boat, and the length of the contact area for the lift sections 356b. The final step in assembling the two lifting sections 356b is to place the two mounting adapters 350b with the cradle structure 182b and the bunker member 180b into engagement with the lift member which (as indicated earlier) are the two forks 322 of the fork lift 310.

Figure 16:
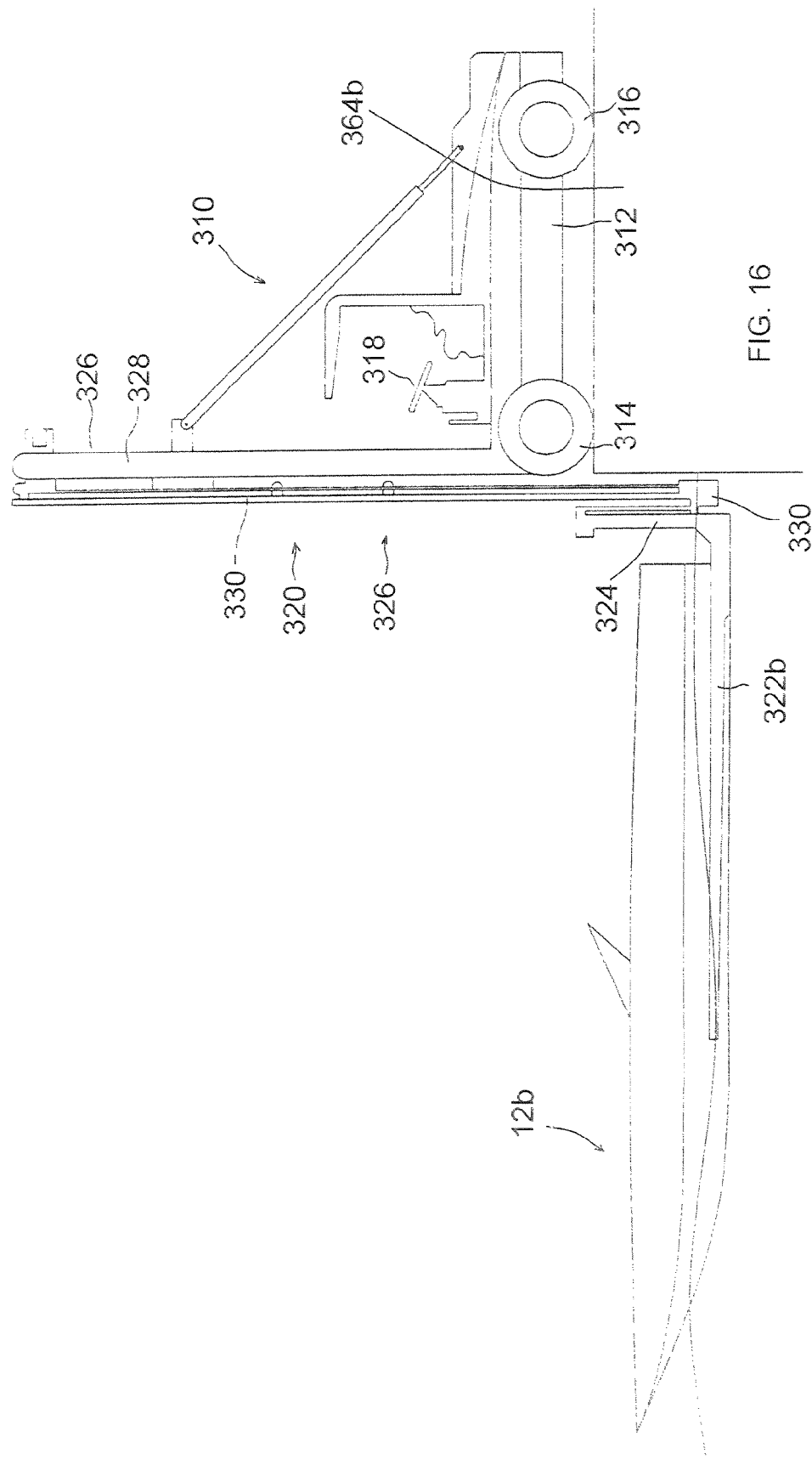
FIG. 16 is a side elevational view of an apparatus used in the method of a third embodiment of the present invention where the apparatus is in a position where it is beginning to lift a boat out of the water.

To proceed further with the description of the present invention reference will now be made to FIGS. 16 through 19. With reference to FIG. 16, the fork lift 310 is moved to its location where the lifting of the boat from the water is to be accomplished. With further reference to FIG. 16, it can be seen that the fork lift 310 has been moved to the front edge of a dock indicated at 364b. In FIG. 16, the two lift sections 356b are shown at a somewhat higher elevation, and prior to initial engagement with the boat, the lift sections 356b would be in a somewhat lower location than shown in FIG. 16. With the two lift sections 356b being positioned at a lower location in the water, the boat 12 is floated into the receiving region between the lift sections 356b. Then the lifting mechanism of the fork lift is used to raise the two forks 322 upwardly (thus raising the entire lift sections 356b, and in FIG. 16 the location of the lift sections 356b is at a location where the boat 12 is now being lifted out of the water.).

Figure 17:
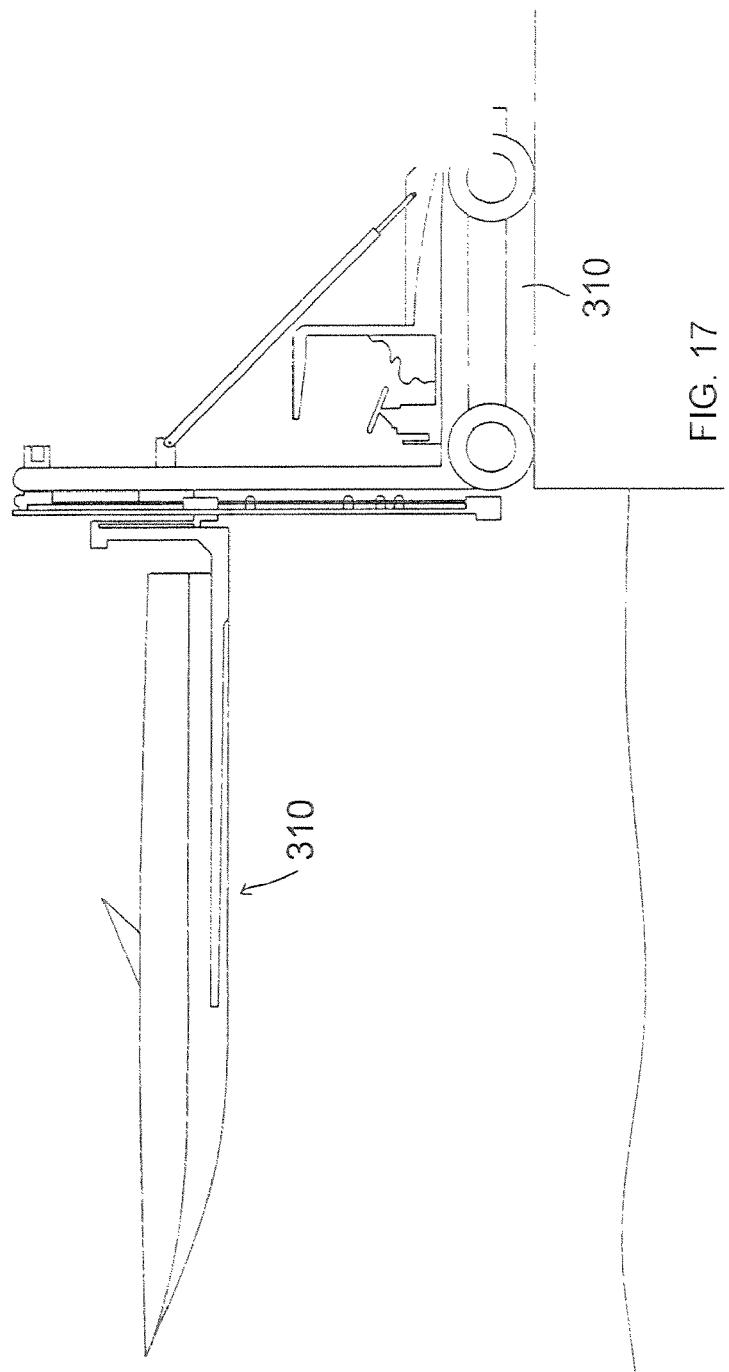
FIG. 17 is a side elevational view similar to FIG. 16, but showing the boat having been lifted to a higher elevation.
Figure 18:
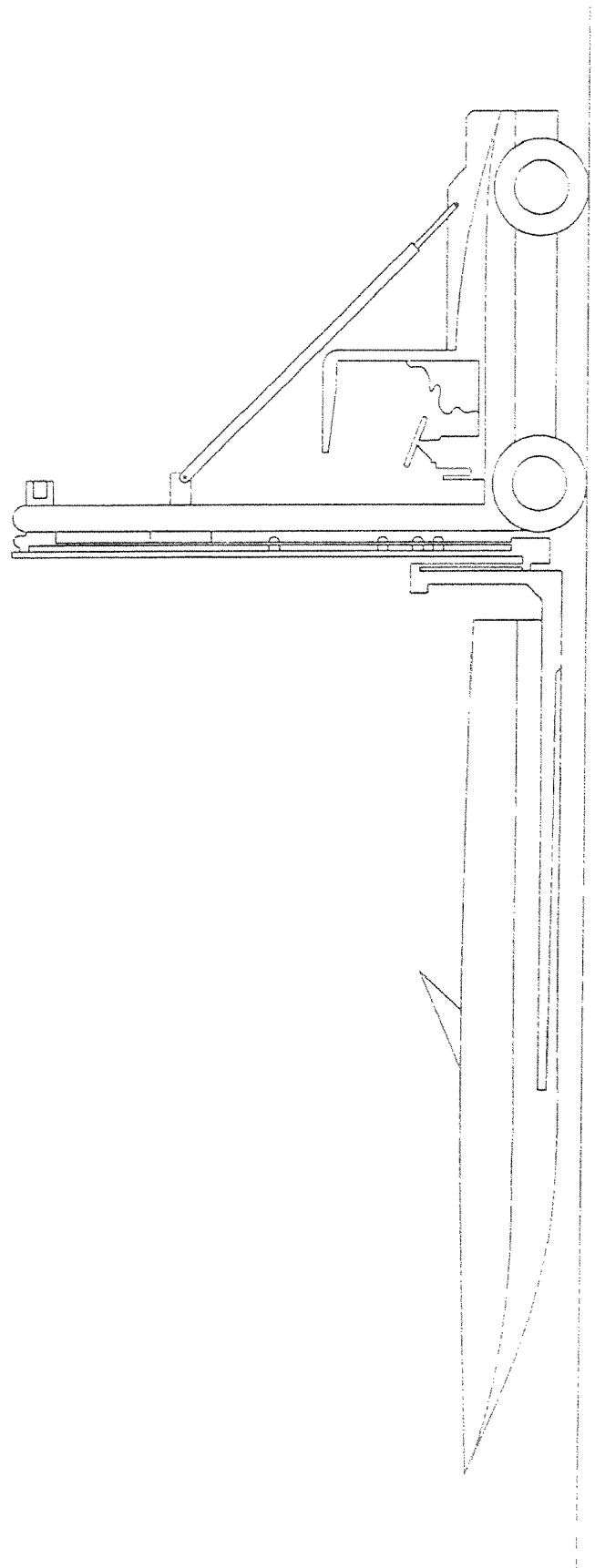
FIG. 18 is a view similar to FIGS. 16 and 17, but showing the boat being positioned at a lower location for travel over a land surface.

When the boat is lifted clear of the water, the fork lift 310 can be operated in the usual manner to move the boat 12 to a desired location, such as a storage location, a maintenance operation location, etc. In FIG. 17 the boat is shown raised up to a higher level. This could be necessary to clear other objects which are in the same vicinity. Alternatively, it could be raised to a higher level to position the boat into a storage facility which is at that elevation. In FIG. 18, the boat 12 has been dropped down to a lower location where it is only a short distance above the ground surface.

To launch the boat 12, the steps given above are simply accomplished in the reverse position. The boat 12 would be positioned to be carried by the two lifting sections 356b, and then the fork lift 310 would be driven to the location near the water where the boat is to be launched. With reference to FIG. 17, the fork lift 310 would be positioned on the dock where the boat would be above the water, and then the fork lift would lower the boat down to the water, and then continue dropping the lift member 322 until the boat 12 is entirely supported by being floated in the water.

Also, in the earlier text relating to the first embodiment, the benefits of the inflatable bunker members 180b and cradle structures 182b were discussed, and some of these will be summarized briefly in these remarks relating to the third embodiment as well.

The bunker members 180b are constructed so that the flow of air in the entire inner chamber of the bunker is not obstructed. Thus, the cushioning action of each of the bunker members 180b is such that the upper surfaces of each pressurized bunker member 180b maintain the substantially same air pressure throughout. The result is that each unit of the contact area of the bunker member 180b exerts a substantially uniform pressure against the portion of the bottom surface of the hull. Also, as the transport apparatus is moved over a ground surface, any impacts created by holes or bumps in the ground surface are substantially alleviated by the cushioning effect of these inflatable bunkers 182b. However within the broader scope of the present invention, it is conceivable that in certain designs or situations, separate inflated sections may be used in the bunkers 180b.

With regard to the presence of the inflating and venting means in the form of a typical air valve 240b, there is an additional advantage in that this enables the pressure in the bunkers 180b to be adjusted to match the characteristics of the boat which is being lifted.

b) Initial Review and Analysis of the Method

Figure 21A:
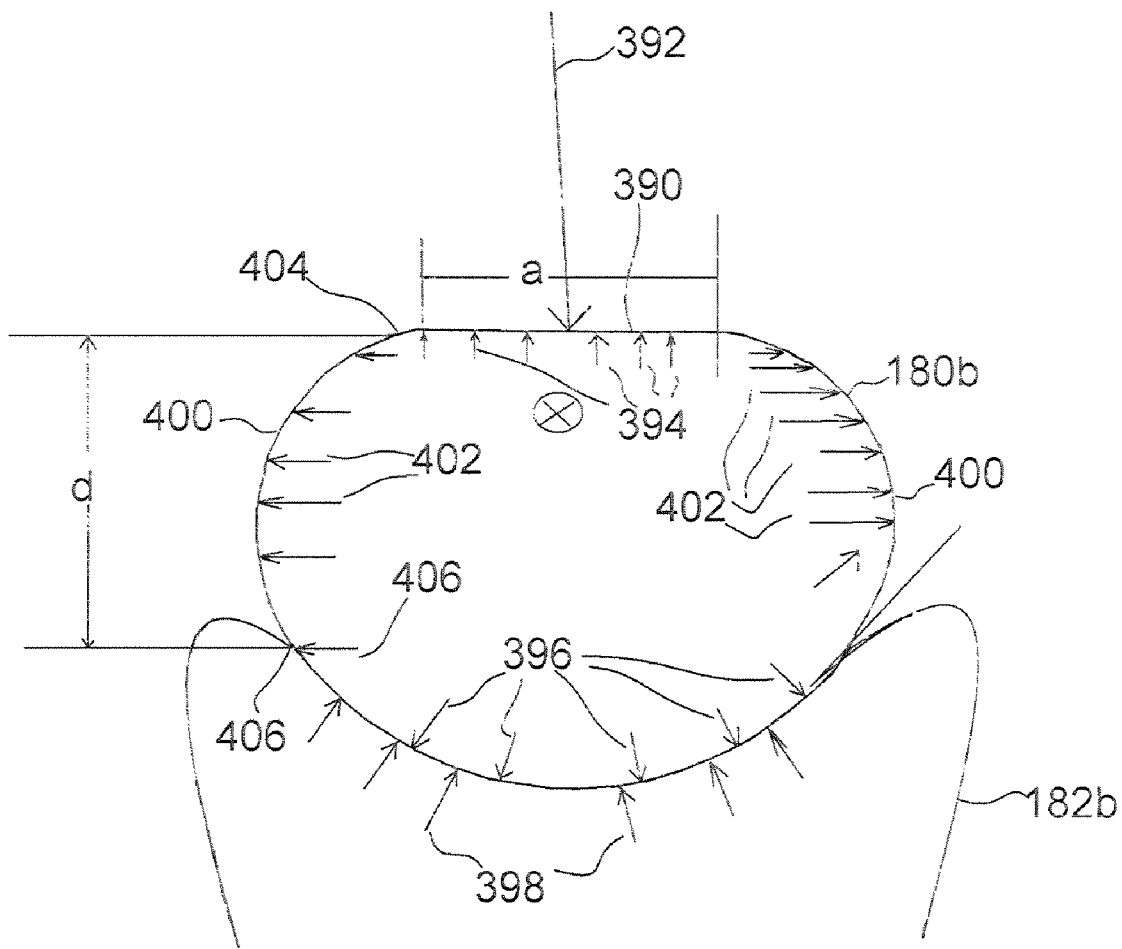
FIGS. 21A-D are cross sectional views which illustrate the inflated bunker in the recess of the cradle structure with the bunker being inflated to different pressures to illustrate certain physical principles relating to how the bunker is affected and how the forces related to the weight of the boat are reacted into the bunker and into the structure.
Figure 21B:
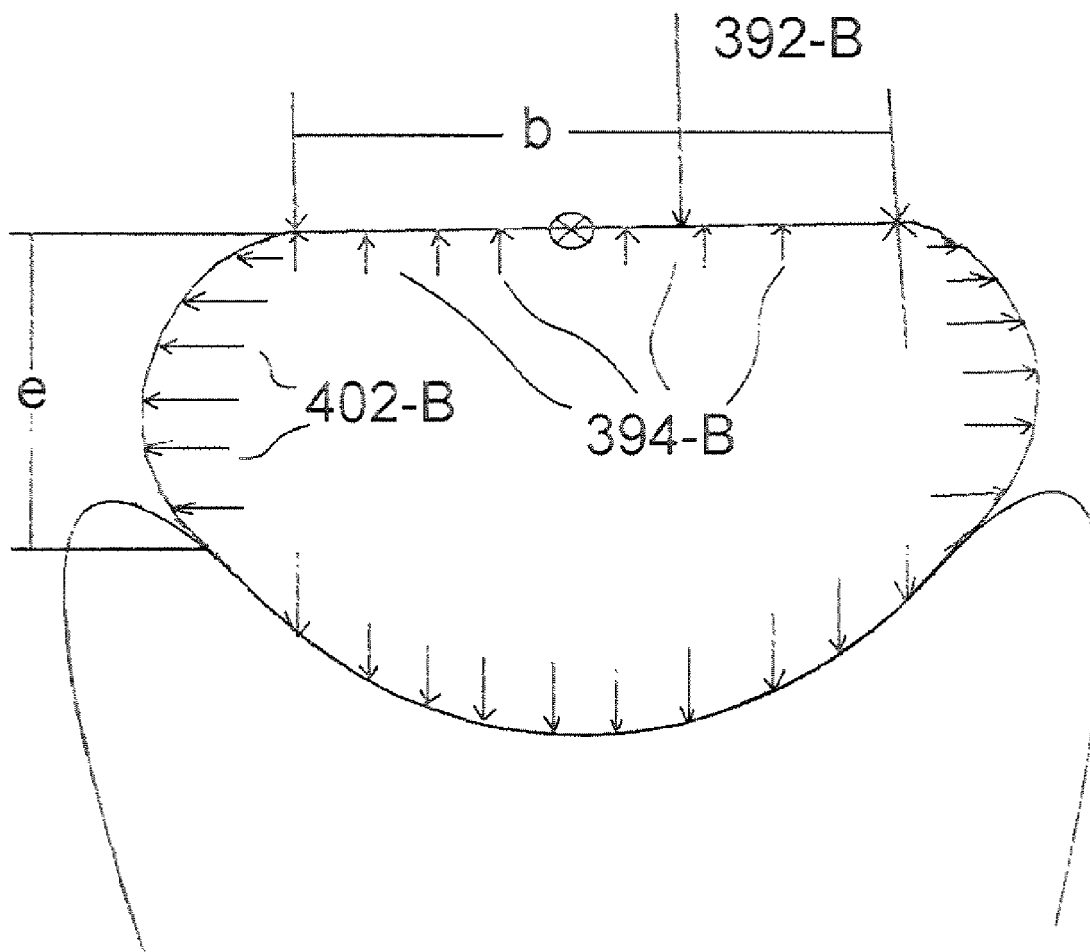
Figure 21C:
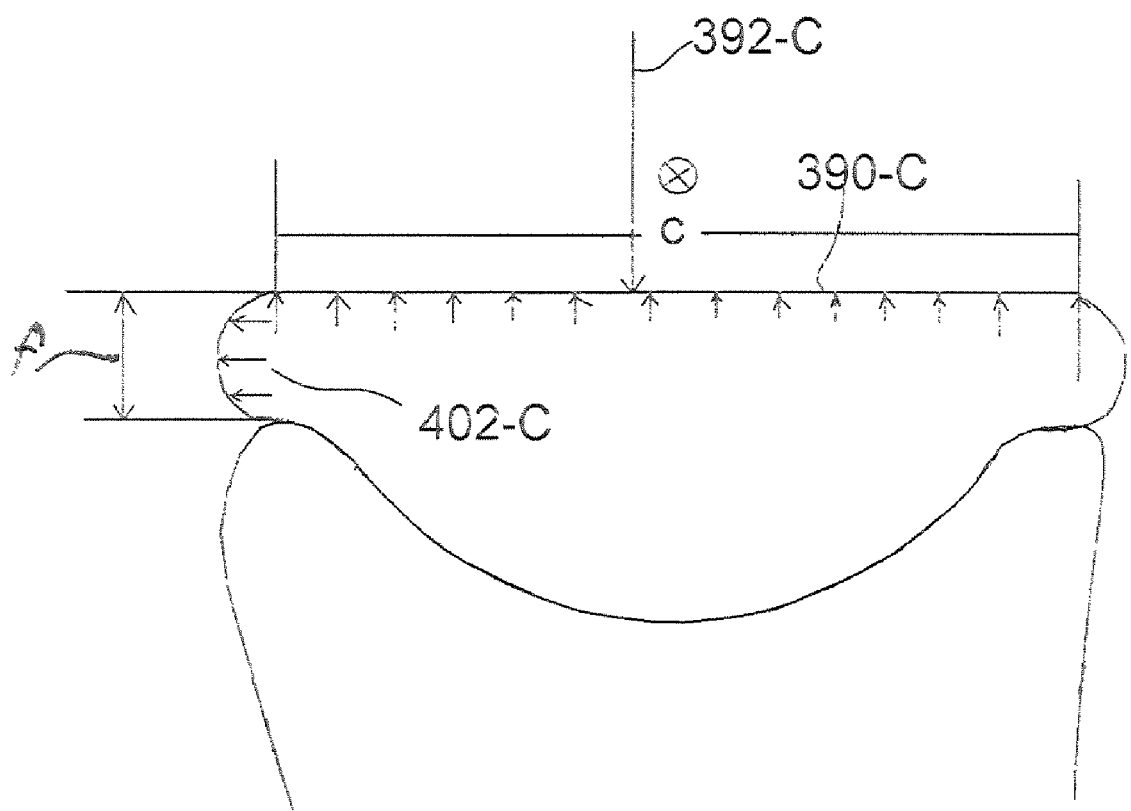
Figure 21D:
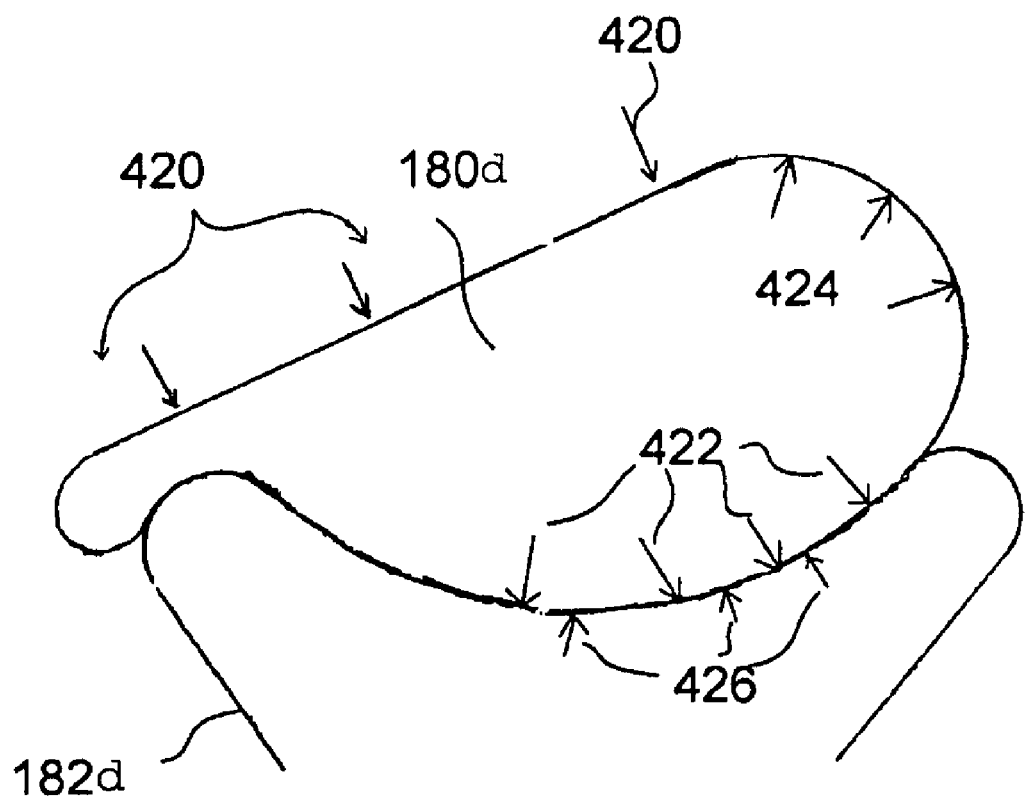

Since there are a variety of boats which would be lifted from the water and also launched into the water, having different sizes, weights, and sometimes different hull configurations, and various local problems and situations, it is desirable that the lift sections be able to adapt to these varying situations. This will be discussed in the following text, and in that discussion there will be reference to several figures, namely FIGS. 19, 20A, 20B, and 21A-D. At this point, brief comments will be made on each of these figures.

i) FIG. 19 is already familiar to us, and this shows the two lift sections 356b supporting the hull of a boat having bottom surfaces 26b that are in an upward and outward slant. It will be noted that the orientation of the cradle structures 182 are tilted somewhat toward the keel 24 so that the orientation of the face of the contact surface 184b will be generally parallel to the orientation of the bottom hull surface portions.

ii) FIG. 20A is a simplified drawing showing somewhat schematically the outline of the upper part of the cradle structure 182b, with the bunker 180b not yet supporting the weight of the boat 12b so that the bunker 180b has in cross section a generally circular configuration. The material from which the bunker 180b is made is a relatively stiff rubber-like product, and there may be an inner tube positioned within the bunker 180b.

iii) FIG. 20B is already familiar to us, and this simply shows the configuration of the bunker 180b when it is pressurized and supporting the boat as shown in FIG. 19. The upper surface of the bunker 180b is flattened.

iv) FIGS. 21A, 21B and 21C are related to one another in that all three of these are rather schematic drawings showing an outline of the bunker 180b and the cradle structure 182b. These three drawings show the bunker member 180b having different configurations depending upon the force of the weight of the boat being applied and the pressure level inside the bunker 180b. The representations of FIGS. 21A to 21D are simplified to some extent. For example, these do not take into consideration the degree of stiffness of the material of the bunkers which would have an effect on how the material would resist being curved with a tight radius. However, the basic analyses are not affected by these to any significant extent. So that legitimate comparisons can be made between the three diagrams of FIGS. 21A, 21B and 21C, it will be assumed that the weight of the boat remains the same, but the internal pressure of the bunker is varied. There will now be a brief discussion of the effects of this on each of the three configurations and a more in depth analytical discussion will follow later in this text.

v) FIG. 21A shows a configuration of the bunker 180b in a situation where the pressure level inside the bunker 180b is rather high relative to the weight of the boat that is being supported. It can be seen that the flattened top part of the bunker 180b that actually engages and supports a portion of the surface of the boat hull has a more narrow width dimension, indicated at "a". In the present discussion, the manner in which the forces are transmitted and the effects of the higher pressure will now be discussed only briefly.

vi) A more detailed analysis is given later in this text to discuss in more detail how the force of the weight of the boat is reacted through the bunker 180b into the cradle structure 182b. This later analysis of FIG. 21A will also reveal that with the area of the hull engaging flat surface portion 390 being relatively small in comparison with what is shown in FIG. 21B and specifically FIG. 21C, the result is that the support force is concentrated at a lesser area of the hull of the boat, which can in some situations be a disadvantage.

vii) This later analysis relative to FIG. 21A will also indicate that in this configuration of FIG. 21A the depth dimension "d" measured from the flat top surface of the bunker 180b to the bottom location at 406 where the bunker engages the support surface of the cradle structure 182b, results in an excessively high force 402 being exerted against the unsupported sidewalls of the bunker to place an unwanted stress on the bunker 180b.

viii) FIG. 21B shows substantially the same configuration as in FIG. 21A, except in this instance the pressure in the bunker 180b is somewhat smaller than in FIG. 21A, relative to the weight of the boat which is being supported. With the pressure reduced moderately in the bunker 180b of FIG. 21B, the width dimension "b" in FIG. 21B is broader in comparison to the dimension "a" of FIG. 21A. Further, the depth dimension "e" between the upper flattened surface of the bunker 180b of FIG. 21B and the lower bunker point of contact with the support surface of the cradle structure 180b, is less than the dimension "b" of FIG. 21A. Thus, the force of the pressure within the bunker against the side walls of the bunker 180b is reduced.

ix) Thus, when we compare this with the configuration of FIG. 21A with that of FIG. 21B we find that there are what can be, in some situations, two benefits in the arrangement of 21B. First there is lower pressure in the bunker 180b, so that the dimension "e" is reduced so that the total internal force of the pressure against the sidewalls of the bunker 180b is reduced. Further, the contact area for the bunker with the hull surface is increased. This also will be discussed in more detail later in this text.

x) FIG. 21C is similar to FIGS. 21A and 21B, but the pressure inside the bunker 180b has been reduced to a substantially lower level. Yet the weight of the boat which is being supported by the bunker 180b remains the same as in FIGS. 21A and 21B. The flattened area on the top side of the bunker 180b is substantially greater in FIG. 21C than in FIG. 21B and FIG. 21A. The effects of this are that there is less force per unit of area that is exerted by the bunker against the boat hull and the total lateral force on sidewalls of the bunker 360b is also reduced due not only to the lower pressure, but also due to the lower depth dimension "f".

xi) Finally, FIG. 21D shows the same basic components, namely, the bunker 180b and the cradle structure 182b. However, this shows a rather different situation where the boat, such as a yacht, has the lower two walls of the hull with steeper slopes, so that the orientation of the plane of the two bottom wall sections of the yacht are at a steeper angle than the orientation of the cradle structure 182b and the bunker 180b. As will be discussed below, it has been found that even with a significant amount of difference in alignment of the contact plane of the cradle structure 182b and the wall of the hull of the boat, the bunker 180b is able to properly support the boat hull.

xii) Also, in FIG. 21D there are indicated the forces which are exerted on the bunker and transmitted into the cradle structure. The force from the weight of the boat indicated at 420 is shown as being perpendicular to the contact surface of the bunker 180b. Further, as in the earlier embodiments, this force is transmitted into the contact surface of the cradle structure 182b and downwardly into the upwardly facing contact surface of the cradle structure, these forces being indicated at 422, with the supporting forces of the cradle structure being indicated at 426. There are the internal air forces at 424 which press against the right side surface portions of the bunker.

xiii) If we analyze this further, we will find that since the boat is assumed to be positioned level horizontally, and since the sidewall is slanted, the force 420 exerted by the contact surface of the boat hull, could be considered as having two force components, as shown in FIG. 21D-1. To explain this further, we have to appreciate that there are lift sections 356b on opposite sides of the boat so that the slanting side surfaces of the boat hull against the slanted contact surfaces of the bunkers have a wedge-like effect to tend to push the two lift sections away from each other. Thus, there is at each of the oppositely positioned bunkers a downwardly directed force component 430 and the lateral force component 428 which actually cancel each other out.

xiv) It is difficult to state accurately how these would be transmitted in the present situation, since there are certain items that are not known, such as the co-efficient of friction between the contact surface of the bunker and the surface of the boat hull. Also, we would have to consider the stiffness or flexibility of the material of the bunker in determining with greater precision how these loads are distributed over the contact surface areas and other factors.

However, it has been found that in this situation, the force of the weight of the boat would have two lateral force components which would form the contact surface of the bunkers to a steeper slant. The bunker's end portion closest to the boat would be pressed in a manner so that it overhangs the inside upper portion of the bunker. In this position, the bunker properly supports the boat.

c) Further Analysis of the Configurations of Bunker 180b and the Cradle Structure 180b as Shown in FIGS. 21A, 21B, 21C and 21D.

In an earlier part of this text, there were shown the configurations of the bunker 180b in the four different situations presented in FIGS. 21A-21D, and these were discussed in terms of the end results of these different configurations. In each of those FIGS. 21A-21D, while the effects were discussed the analysis leading to these conclusions were not discussed, and it was indicated that these would be discussed later in this text. Accordingly, in the following text, there will be further discussions of the configurations of FIGS. 21A, 21B, 21C and 21D.

i) As indicated above, in FIG. 21A the inflatable bunker 380b is shown as having been inflated to a high pressure relative to the weight of the boat so that the weight of the boat compresses the bunker member 180b very little so as to flatten only a relatively small area of the top surface of the bunker, indicated at 390. The width dimension of this depressed region 390 is indicated at "a" in FIG. 21A, and it can be seen to be relatively narrow. Let us now review the various force components which led to the conclusions given in the earlier discussion of FIG. 21A.

ii) The downward force from the weight of the boat as it is lifted out of the water is indicated by the single arrow 392 in FIG. 21A. It is to be understood, however, that although there is only the single arrow 392, this downward force from the weight of the boat indicated at 392 would be distributed over all of the depressed surface 390 which is flattened by contact with the lower surface of the hull of the boat.

The weight of the boat is supported at the bunker surface 390 by an upward force of the internal air pressure in the bunker 180b, indicated by the arrows 394, this force at 394 being applied by the pressurized air in the bunker member 180b over the flattened contact area of the surface at 394.

iii) We have to recognize that the force of the compressed air inside the bunker member 380 is exerted equally against the entire inside surface of the bunker member 118b and the force of the air pressure is perpendicular to the adjacent inside surface area. Thus, the internal compressed air also presses the bottom portion of the inflated bunker 180b downwardly into a curved configuration pressing against the upwardly facing surface of the bunker member 82b, and this force is indicated by the arrows at 396.

iv) With further reference to FIG. 21A, the force exerted at 396 is a result of the force of the weight of the boat 392 compressing the air in the bunker member which in turn is pressing downwardly at 396 and against the cradle member 82b. The upward support force 398 exerted by the cradle member balances the force 392 of the weight of the boat, and this downward force on the cradle structure 182b is transmitted in turn into the lift member 322 which in turn passes these force loads into the structure of the forklift 210.

v) With yet further reference to FIG. 21A, let us now turn our attention to the effect of the relatively high air pressure in the bunker member 180b acting against sidewalls 400, and more specifically against the entire portion of the sidewall portion 400 which is not in contact with either of the boat hull 14 or the support surface of the cradle structure 182. These pressure forces are indicated by the arrows at 402. In analyzing these force components, it is necessary to keep in mind that all of the forces applied by the weight of the boat, the internal pressure from the compressed air in the bunker 302b and the cradle structure have to balance out.

vi) As indicated before, the upwardly directed internal pressure forces of the bunker member 180b against the upper surface 390 are reacted into the contact area of the hull of the boat, and the downwardly directed pressure forces of the bunker balance out the upward force of the upwardly facing support surface of the cradle structure.

vii) Now let us "shift gears" and look at the internal sidewall pressure forces indicated at 402. The only place where these forces 402 can be reacted is into the wall of the bunker 180b. Analysis indicates that the only place where the total pressure forces at 402 could be reacted into the bunker wall section is at the wall section that is between the upper and lower Vocations 404 and 406, respectively, and these are tension forces which are reacted into the rest of the bunker that is between the boat hull and the cradle structure. The dimension of this wall section is indicated at "b" of FIG. 21A.

viii) At this point, it should be noted that this flattened configuration of only a small top portion of the bunker member is due to the fact that there is a relatively high pressure within the bunker member 80b. Also, as indicated above the bunker member 180b in this configuration of FIG. 21A has a relatively large height dimension which is shown by the arrow "d" extending from the region where the boat hull contacts the bunker member 180b and the contact edge portion of the where the cradle structure 182b is in contact with the bunker member 180b. Then when we look at FIGS. 21B and 21C, their depth dimensions "e" and "f", respectively, are smaller, with "f" being much smaller. Then when we make a similar analysis relative to FIGS. 21B and 21C, a comparison with somewhat surprising results will be made.

ix) To continue this analysis let us look at the next drawing in this sequence which is FIG. 21B which shows substantially the same arrangement as in FIG. 21A, except that the internal pressure of the bunker 180b is lower than in the configuration of FIG. 21A.

x) With the force of the weight of the boat remaining the same, one effect of reducing the pressure level in the bunker 180b is that the force of the weight of the boat is distributed over a larger area of contact (in comparison with FIG. 21A) with the boat hull. This downward force of the weight of the boat is indicated by the arrow 392-B and the resisting upward force due to the air pressure within the bunker member 180b is indicated at 394-B. Because the weight of the boat remains the same while the pressure in the bunker has been reduced, and also because the air pressure is reduced, the total contact area of the bunker with the boat hull must increase. This results in the boat being somewhat lower so as to be somewhat closer to the cradle structure 182b. Thus, the total upward force 394-B is the same as this same force in FIG. 21A, but distributed over a larger area.

xi) With further reference to FIG. 21B, it should be noted that the area of the force 402-B exerted against the sidewall 400 has been reduced. Also, the internal air pressure is reduced from the pressure of FIG. 21A. Thus, the total force, calculated by the air pressure multiplied by the area of the applied force indicated at 402-B is reduced. That means that there is less stress on the bunker in FIG. 21B in comparison with FIG. 21A.

xii) Reference is now made to FIG. 21C and it is to be assumed that the same boat having the same weight is being supported by the bunker member 180b and cradle structure 182b, but at a yet lower pressure level in the bunker member 180b compared with the configuration of FIG. 21B. It can be seen that the area of the flattened upper surface, indicated at "c" in FIG. 21, 390c has become substantially wider. Also, the bunker member 180b has the outer side surface portions 400-B positioned further outwardly and actually extending over the upper rounded edge portions of the cradle structure. Also, there is a relatively small depth dimension "f" which is the spacing between the upper flattened surface of the bunker member 80 and the furthest upper surface portion of the cradle member 82b that engages the bunker 180b.

xiii) Now let us make comparisons of the lateral forces 402-A of FIG. 21A, 402-B of FIG. 21B and the force 402-C of FIG. 21C.
1) in FIG. 21A, the vertical depth dimension "d" is approximately three times as large as the depth dimension "f" of the much lower pressure configuration of FIG. 21C and approximately and fifty percent greater than the dimension "e" of FIG. 21B.
2) Next we look at the width dimension of the upper hull contact surface 390 which engages the hull of the boat. This is given by the dimensions "a", "b", and "c" of, respectively, FIGS. 21A, 21B, and 21C.
3) The dimension "c" in FIG. 21C is two and one half times greater than the dimension "a" of FIG. 21A.
4) As indicated earlier in this analysis, since it is assumed that the weight of the boat remains constant, that would mean that the pressure inside of the bunker member is inversely proportional to the width of the upper contact area at which the hull is being engaged by the bunker. The reason for this is that the weight of the boat would be supported by a larger contact surface area of the upper surface portion of the bunker 180b, and this means lower internal pressure in the bunker.
5) This indicates that the internal pressure of the interior of the bunker in the figuration of FIG. 21A is two and one half times as great as the pressure in internal pressure of the bunker member 180b in the situation of FIG. 21C.
6) Now to continue this analysis, the second comparison that is to be made is between the depth dimension "d" in FIG. 21A to the depth dimension "f" of FIG. 21C. The total force 402 against the sidewall of the bunker member 80b is proportional to this depth dimension with these three depth dimensions being identified as "d", "e" and "f" in the three FIGS. 21A, 21B and 21C. The reason for this is that the area against which the pressure force 402 is exerted is over a greater area, and if the internal pressure were equal, the force 402 would be proportional to the difference in those dimensions. In this situation the dimension "d" of FIG. 21A is approximately three times greater than the dimension "f" of FIG. 21A. Thus, the depth of this area inside the bunker member 180b in the situation of FIG. 21A is three times greater than in the depth of dimension "f" in FIG. 21C.
7) With these preliminary calculations being completed, we can now make a calculation relating to the sort of stress which is placed on the material of the bunker 180b in the situation of FIG. 21C and the configuration of FIG. 21A with the internal air pressure of FIG. 21A being about two and one half times as great as the lower air pressure of FIG. 21C. The thought that would immediately come to mind is that if we multiply the pressure by two and one half times, the bunker would be subjected to two and one half times the stress. However, that is not what happens. As indicated above, when the pressure is higher in the bunker, its vertical dimension is increased, thus increasing the areas of the unsupported sidewall surfaces.
8) Accordingly, to calculate the actual stress resulting from FIG. 21A and FIG. 21C, we have to multiply the number two and one half (representing the difference in air pressure) with the number three (which is the difference in the vertical dimensions of the bunker).
By multiplying three by two and one half, we find that the actual stress which is placed on the bunker in the situation of FIG. 21A is seven and one half times as much as the stress imposed on the bunker in the configuration of FIG. 21C.

d) Summary

This final section is to summarize in a more orderly format most of the matters (or at least the more important matters) presented in the descriptive text and analyses in Sections "b" and "c" in the immediately previous discussion of this third embodiment of the present invention.

In general, sections "b" and "c" are intended to give the reader insights into:
  i) the functional features of the use of the lift sections in the method of the invention;
  ii) how the forces imposed by the boat on the lift sections in various situations are transmitted through the components and how these affect the bunkers and the other components; and
  iii) an understanding of the details of how the method of the present invention is able to adapt to various situations.

As a second set of matters that are discussed, there are various factors that influence the details of how the method of the present invention should or can be used. Among these are the following:
  i) the characteristics of the boat itself, such as the weight of the boat, the length of the portions of the boat that are engaged by the bunker, and the amount of the lateral slant of the bottom walls of the boat are other factors relating to its configuration;
  ii) the characteristics of the bunker itself, such as the characteristics of the material that forms the bunker, its degree of stiffness or flexibility, its coefficient of friction, etc.;
  iii) the stress limits of the components of the lift sections and other apparatus;
  iv) the structural strength of the boat hull at its area of engagement;
  v) the character of the land surface over which the boat is carried. (For example, if the boat would it be carried at a higher speed over a surface that has potholes, this could result in impact loading on the bunkers.)

A third set of information presented in sections "b" and "c" relates to the bunker configurations of FIGS. 21A-21D, where there is illustrated how different pressure levels of the bunkers influence the stresses, advantages, disadvantages, or other effects.

In a situation of a marina handling a wide variety of boats, it may be desired to set the pressure to which the bunker is inflated at a "happy medium" to enable the bunkers to perform properly with a wide variety of boats without having to change the pressure in the bunker, or take other measures such as using a lifting apparatus better suited for various types of boats. Or certain situations may dictate a change in the internal pressure of the bunker.

In summary, it has been found that the method of the present invention as described herein provides a high degree of reliability, versatility and adaptability to various situations.

It is to be understood that various modifications could be made in the method of the present invention without departing from the basic teachings thereof. If so, these should be considered to be within the scope of the broader teachings of the method of the present invention.

Therefore I claim:

1. A method of lifting a boat from a body of water and moving said boat over a land surface wherein said boat comprises a hull with a longitudinal front-to-rear center axis and right and left bottom hull surfaces in a manner to apply lift forces along a substantial length of said bottom surfaces, said method comprising;
   a) providing a pair of elongate right and left elongate lift members;

b) positioning an elongate cradle structure on each of said lift members along a substantial length of the lift member, with each cradle structure having an upwardly facing cradle support surface comprising a lower middle cradle support surface portion with upwardly and outwardly sloping side retaining cradle support surface portions, with said cradle support surface portions defining an elongate recess extending along at least a substantial length of said cradle structure;

c) positioning in the recess of each cradle structure an elongate inflatable bunker having an inflatable pressure chamber, and with the cradle structure being capable of providing both lateral and vertical support for the inflatable bunker, in a manner that there are right and left lift sections, each of which comprises at least its related lift member, cradle structure and the inflatable bunker;

d) providing an operative connection of the two lift members to a mobile lift apparatus and providing at least one steerable wheeled portion for said lift apparatus;

e) positioning the mobile lift apparatus with the lift sections at a lift location which is at or adjacent to a body of water;

f) positioning the two lift sections in the body of water at a lift location where the two lift sections are beneath the water surface and are arranged spaced laterally from one another to provide therebetween a boat receiving region, and with the two bunkers inflated to a pressure level that provides cushioned support throughout at least a substantial length of the bunkers;

g) positioning the boat to be lifted in the boat receiving region;

h) raising the lift sections so that support members to engage the bottom surfaces of the boat and lift the boat upwardly; and i) operating the mobile lift apparatus to move the boat over a land surface.

2. The method as recited in claim 1, further comprising launching the boat into a body of water by:

a) supporting the boat on the two lift sections;

b) with the two lift sections having said operative connection to the mobile apparatus, moving the mobile apparatus to be at or adjacent to, a body of water; and c) positioning and lowering the boat into the body of water so that the boat is able to be supported in the body of water.

3. The method as recited in claim 1, wherein one of said bunkers is arranged so that its pressure chamber is able to be pressurized so that a substantial portion of the pressure chamber is pressurized to a substantially equal pressure along said substantial length of the pressure chamber.

4. The method as recited in claim 3, where said substantial portion of the pressure chamber having the substantially equal pressure level is substantially interiorly open along its length in order to maintain said substantially equal pressure.

5. The method as recited as claim 1, wherein said side retaining cradle support surface portions are concavely curved from a more horizontally aligned middle portion to a more vertically aligned outer surface portion so that when the bunker and the cradle structure are supporting the weight of a boat, the lower and side surface portions of the cradle structure extend in a generally concavely curved contour upwardly to upper side surface portions of the side retaining cradle support surface portions and engage the bunker to provide both vertical and lateral support for the bunker.

6. The method as recited in claim 5, wherein said upper more vertically aligned surface portion transitions at a transition surface portion from its upper surface portion further laterally outwardly in a generally convexly curved outer structure portion of the cradle structure.

7. The method as recited as claim 6, wherein said at least one bunker is sized so that in its inflated configuration without any substantial force load being imposed upon it, extends above an upper level of said cradle structure in a manner that when a vertical load from weight of a boat is imposed downwardly on said bunker, said bunker is able to extend laterally to extend over said upper generally convexly curved outer surface portion of said cradle structure.

8. The method as recited in claim 7, wherein said bunker and said cradle structure of said at least one of said lift sections are arranged so that if the surface of the hull of a boat supported by the bunker and the cradle structure is at a steeper angle from horizontal relative to an alignment plane of an upper portion of the cradle structure, an upper portion of the bunker which in its inflated position is positioned above said upper portion of the cradle structure and is able to move to a position where an upper contact surface area of the bunker that is in engagement with the adjacent region of the surface of the boat hull, in a manner that a more inwardly positioned portion of the bunker is at a lower elevation and the contact surface area extends upwardly and outwardly at a steeper slope to come into contact engagement with the adjacent region of the boat hull.

9. The method as recited in claim 6, wherein the transition surface portions of the cradle structure slope downwardly and inwardly toward a center location of the cradle structure, in a manner that two tangent lines drawn downwardly and inwardly from the transition locations meet to form an angle which is about a right angle so as to be able to exert a retaining force against the bunker that has a substantial lateral force component to provide lateral support for the bunker.

10. The method as recited in claim 6, wherein the transition surface portions of the cradle structure slope downwardly and inwardly toward a center location of the cradle structure, in a manner that two tangent lines drawn downwardly and inwardly from the transition locations each form with a horizontal plane an angle which is about two-thirds of a right angle to one-third of a right angle so as to be able to exert a retaining force against the bunker that has a substantial lateral force component to provide lateral support for the bunker.

* * * * *